United States Patent
Allen et al.

(10) Patent No.: US 8,056,092 B2
(45) Date of Patent: Nov. 8, 2011

(54) METHOD AND APPARATUS FOR WIDGET-CONTAINER HOSTING AND GENERATION

(75) Inventors: Stewart O. Allen, Reston, VA (US); Scott F. Cosby, Rye, NY (US); John A. Fath, Arlington, VA (US); Dylan J. Greene, Falls Church, VA (US); Matthew J. Keesan, Washington, DC (US); Hooman Radfar, Arlington, VA (US); Cyrus B. Radfar, Arlington, VA (US); Carlos F. Reverte, Miami, FL (US)

(73) Assignee: Clearspring Technologies, Inc., McLean, VA (US)

( * ) Notice: Subject to any disclaimer, the term of this patent is extended or adjusted under 35 U.S.C. 154(b) by 991 days.

(21) Appl. No.: 11/537,362

(22) Filed: Sep. 29, 2006

(65) Prior Publication Data

US 2008/0148283 A1    Jun. 19, 2008

(51) Int. Cl.
G06F 3/00 (2006.01)
G06F 9/44 (2006.01)
G06F 9/46 (2006.01)
G06F 13/00 (2006.01)

(52) U.S. Cl. .............................................. 719/320
(58) Field of Classification Search ............ 719/320
See application file for complete search history.

(56) References Cited

U.S. PATENT DOCUMENTS

| | | |
|---|---|---|
| 5,230,072 A | 7/1993 | Smith et al. |
| 5,261,002 A | 11/1993 | Perlman et al. |
| 5,675,510 A | 10/1997 | Coffey et al. |
| 5,781,189 A | 7/1998 | Holleran et al. |
| 5,796,952 A | 8/1998 | Davis et al. |
| 5,892,900 A | 4/1999 | Ginter et al. |
| 6,064,980 A | 5/2000 | Jacobi et al. |
| 6,100,890 A | 8/2000 | Bates et al. |
| 6,108,637 A | 8/2000 | Blumenau |
| 6,112,238 A | 8/2000 | Boyd et al. |
| 6,125,388 A | 9/2000 | Reisman |
| 6,233,601 B1 | 5/2001 | Walsh |
| 6,233,684 B1 | 5/2001 | Stefik et al. |

(Continued)

FOREIGN PATENT DOCUMENTS

EP    1942422 A1    7/2008

(Continued)

OTHER PUBLICATIONS

International Search Report and Written Opinion mailed Apr. 18, 2008 for International Application No. PCT/US07/80086, 9 pages.

(Continued)

*Primary Examiner* — Andy Ho
*Assistant Examiner* — Timothy A Mudrick
(74) *Attorney, Agent, or Firm* — Cooley LLP

(57) ABSTRACT

A method includes receiving at least one of a widget or a reference to a widget, where the widget can be at least one of a static data object, a media object, or a software object. At least a portion of a widget container, which is a procedural software framework containing a service module associated with the widget and the widget, is generated. The service module can be a pre-defined function associated with the widget container before the widget container is generated. The widget container can be configured to be executed at a widget-container processing device in response to a reference to the widget container being accessed from a processor-readable vehicle.

27 Claims, 11 Drawing Sheets

U.S. PATENT DOCUMENTS

| | | |
|---|---|---|
| 6,236,971 B1 | 5/2001 | Stefik et al. |
| 6,266,649 B1 | 7/2001 | Linden et al. |
| 6,269,361 B1 | 7/2001 | Davis et al. |
| 6,311,194 B1 | 10/2001 | Sheth et al. |
| 6,314,448 B1 | 11/2001 | Conner et al. |
| 6,317,787 B1 | 11/2001 | Boyd et al. |
| 6,360,261 B1 | 3/2002 | Boyd et al. |
| 6,374,252 B1 | 4/2002 | Altoff et al. |
| 6,466,974 B1 | 10/2002 | Nelson et al. |
| 6,546,393 B1 | 4/2003 | Khan |
| 6,658,568 B1 | 12/2003 | Ginter et al. |
| 6,665,867 B1 | 12/2003 | Ims et al. |
| 6,701,521 B1 | 3/2004 | McLlroy et al. |
| 6,748,555 B1 | 6/2004 | Teegan et al. |
| 6,772,180 B1 | 8/2004 | Li et al. |
| 6,810,356 B1 | 10/2004 | Garcia-Franco et al. |
| 6,857,124 B1 | 2/2005 | Doyle |
| 6,970,853 B2 | 11/2005 | Schutzer |
| 6,985,905 B2 | 1/2006 | Prompt et al. |
| 6,985,929 B1 | 1/2006 | Wilson et al. |
| 6,986,049 B2 | 1/2006 | Delany |
| 7,003,522 B1 | 2/2006 | Reynar et al. |
| 7,003,565 B2 | 2/2006 | Hind et al. |
| 7,016,960 B2 | 3/2006 | Howard et al. |
| 7,024,392 B2 | 4/2006 | Stefik et al. |
| 7,031,932 B1 | 4/2006 | Lipsky et al. |
| 7,035,943 B2 | 4/2006 | Yamane et al. |
| 7,039,599 B2 | 5/2006 | Merriman et al. |
| 7,046,995 B2 | 5/2006 | Rygaard |
| 7,054,900 B1 | 5/2006 | Goldston |
| 7,062,500 B1 | 6/2006 | Hall et al. |
| 7,062,540 B2 | 6/2006 | Reddy et al. |
| 7,062,561 B1 | 6/2006 | Reisman |
| 7,072,672 B1 | 7/2006 | Vanska et al. |
| 7,076,521 B2 | 7/2006 | Davison |
| 7,080,159 B2 | 7/2006 | Chu et al. |
| 7,085,682 B1 | 8/2006 | Heller et al. |
| 7,089,237 B2 | 8/2006 | Turnbull et al. |
| 7,099,926 B1 | 8/2006 | Ims et al. |
| 7,100,054 B2 | 8/2006 | Wenisch et al. |
| 7,103,912 B2 | 9/2006 | Xia et al. |
| 7,117,250 B1 | 10/2006 | Wu |
| 7,117,535 B1 | 10/2006 | Wecker |
| 7,130,964 B2 | 10/2006 | Ims et al. |
| 7,133,846 B1 | 11/2006 | Ginter et al. |
| 7,159,116 B2 | 1/2007 | Moskowitz |
| 7,263,551 B2 | 8/2007 | Belfiore et al. |
| 7,392,395 B2 | 6/2008 | Ginter et al. |
| 7,392,483 B2 | 6/2008 | Wong et al. |
| 7,702,675 B1 | 4/2010 | Khosla et al. |
| 7,730,082 B2 | 6/2010 | Sah et al. |
| 7,735,117 B2 | 6/2010 | Nadalin et al. |
| 2002/0040314 A1 | 4/2002 | Tolson |
| 2002/0040394 A1 | 4/2002 | Shapira |
| 2002/0072965 A1 | 6/2002 | Merriman et al. |
| 2002/0082914 A1 | 6/2002 | Beyda et al. |
| 2002/0082923 A1 | 6/2002 | Merriman et al. |
| 2002/0082997 A1 | 6/2002 | Kobata et al. |
| 2002/0083188 A1 | 6/2002 | Hericy et al. |
| 2002/0095336 A1 | 7/2002 | Trifon et al. |
| 2002/0099600 A1 | 7/2002 | Merriman et al. |
| 2002/0120673 A1 | 8/2002 | Tolson et al. |
| 2002/0129092 A1 | 9/2002 | Tolson et al. |
| 2002/0174200 A1 | 11/2002 | Kozina |
| 2003/0014483 A1 | 1/2003 | Stevenson et al. |
| 2003/0028433 A1 | 2/2003 | Merriman et al. |
| 2003/0033403 A1 | 2/2003 | Rhodes |
| 2003/0058277 A1 | 3/2003 | Bowman-Amuah |
| 2003/0070061 A1 | 4/2003 | Wong et al. |
| 2003/0105882 A1 | 6/2003 | Ali et al. |
| 2003/0196121 A1* | 10/2003 | Raley et al. .................. 713/201 |
| 2003/0200145 A1 | 10/2003 | Krassner et al. |
| 2004/0098349 A1 | 5/2004 | Tolson |
| 2004/0107125 A1 | 6/2004 | Guheen et al. |
| 2004/0143667 A1 | 7/2004 | Jerome |
| 2004/0153973 A1 | 8/2004 | Horwitz |
| 2004/0165007 A1 | 8/2004 | Shafron |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0215509 A1 | 10/2004 | Perry |
| 2004/0215515 A1 | 10/2004 | Perry |
| 2004/0215709 A1 | 10/2004 | Basani et al. |
| 2004/0225562 A1 | 11/2004 | Turner |
| 2004/0225566 A1 | 11/2004 | Beyda et al. |
| 2004/0225668 A1 | 11/2004 | Teegan et al. |
| 2005/0038702 A1 | 2/2005 | Merriman et al. |
| 2005/0050301 A1 | 3/2005 | Whittle et al. |
| 2005/0086587 A1 | 4/2005 | Balz |
| 2005/0114774 A1 | 5/2005 | Berryman |
| 2005/0125528 A1 | 6/2005 | Burke, II et al. |
| 2005/0190994 A1 | 9/2005 | Yamanaka |
| 2005/0197991 A1 | 9/2005 | Wray et al. |
| 2005/0198105 A1 | 9/2005 | Schmitz et al. |
| 2005/0210000 A1 | 9/2005 | Michard |
| 2005/0246262 A1 | 11/2005 | Aggarwal et al. |
| 2005/0251805 A1 | 11/2005 | Bamba et al. |
| 2005/0256819 A1 | 11/2005 | Tibbs et al. |
| 2005/0256954 A1 | 11/2005 | Shapira et al. |
| 2006/0004703 A1 | 1/2006 | Spivack et al. |
| 2006/0015406 A1 | 1/2006 | Beyda et al. |
| 2006/0089880 A1 | 4/2006 | Merriman et al. |
| 2006/0106876 A1 | 5/2006 | MacGregor |
| 2006/0112102 A1 | 5/2006 | Shafron |
| 2006/0112341 A1 | 5/2006 | Shafron |
| 2006/0129937 A1 | 6/2006 | Shafron |
| 2006/0136843 A1 | 6/2006 | Shafron |
| 2006/0161513 A1 | 7/2006 | Drumm et al. |
| 2006/0178918 A1 | 8/2006 | Mikurak |
| 2006/0190290 A1 | 8/2006 | Gomez |
| 2006/0218036 A1 | 9/2006 | King et al. |
| 2006/0242379 A1 | 10/2006 | Korgaonkar et al. |
| 2006/0259462 A1 | 11/2006 | Timmons |
| 2006/0277457 A1 | 12/2006 | Salkind et al. |
| 2007/0038934 A1 | 2/2007 | Fellman |
| 2007/0078777 A1 | 4/2007 | Demartini et al. |
| 2007/0078953 A1 | 4/2007 | Chai et al. |
| 2007/0101146 A1 | 5/2007 | Louch et al. |
| 2007/0101291 A1 | 5/2007 | Forstall et al. |
| 2007/0106759 A1 | 5/2007 | Willie et al. |
| 2007/0112676 A1 | 5/2007 | Kontio et al. |
| 2007/0130541 A1 | 6/2007 | Louch et al. |
| 2007/0192339 A1 | 8/2007 | Baker et al. |
| 2007/0209013 A1 | 9/2007 | Ramsey et al. |
| 2007/0250618 A1 | 10/2007 | Hammond |
| 2007/0288518 A1 | 12/2007 | Crigler et al. |
| 2007/0288858 A1 | 12/2007 | Pereira et al. |
| 2008/0010133 A1 | 1/2008 | Pyhalammi et al. |
| 2008/0010319 A1 | 1/2008 | Vonarburg et al. |
| 2008/0040426 A1 | 2/2008 | Synstelien et al. |
| 2008/0040681 A1 | 2/2008 | Synstelien et al. |
| 2008/0091777 A1 | 4/2008 | Carlos |
| 2008/0140775 A1 | 6/2008 | Lee et al. |
| 2008/0141141 A1 | 6/2008 | Moore et al. |
| 2008/0141153 A1 | 6/2008 | Samson et al. |
| 2008/0168245 A1 | 7/2008 | DeAtley et al. |
| 2008/0168391 A1 | 7/2008 | Robbin et al. |
| 2008/0319856 A1 | 12/2008 | Zito et al. |

FOREIGN PATENT DOCUMENTS

| | | |
|---|---|---|
| WO | 0186384 A2 | 11/2001 |
| WO | 0221404 A1 | 3/2002 |
| WO | WO 2006/028488 A2 | 3/2006 |
| WO | WO 2008/052013 A2 | 5/2008 |
| WO | WO 2008/060828 A2 | 5/2008 |

OTHER PUBLICATIONS

Widgetbox, Widgetizing the Web [online], [retrieved on Jan. 11, 2006]. Retrieved from the Internet: <URL: http://widgetbox.com>. (3 pgs).

MochiBot, "It's 3a.m. Do you know where your Flash content is?", Flash tracking, Traffic Monitoring, and Analytics Service [online], [retrieved on Jan. 11, 2006]. Retrieved from the Internet: <URL: MochiBot.com, http://www.mochibot.com>. (4 pgs).

Overview of the SWFs you are tracking :: MochiBot.com Dasboard Tour [online], [retrieved on Jan. 11, 2006]. Retrieved from the Internet: <URL: http://www.mochibot.com/tour_dashboard.html>. (2 pgs).

Flash Traffic Analysis for a SWF :: MochiBot.com SWF Detail Tour [online], [retrieved on Jan. 11, 2006]. Retrieved from the Internet: <URL: http://www.mochibot.com/tour_swfdetail.html>. (2 pgs).

See who's hosting your SWF :: MochiBot.com Host Report Tour [online], [retrieved on Jan. 11, 2006]. Retrieved from the Internet: <URL: http://www.mochibot.com/tour_hostreport.html>. (2 pgs).

Daily Flash Performance Report :: MochiBot.com Traffic Report Tour [online], [retrieved on Jan. 11, 2006]. Retrieved from the Internet: <URL: http://www.mochibot.com/tour_trafficreport.html>. (2 pgs).

Snipperoo Web Widgets, Snipperoo Universal Widget [online], [retrieved on Jan. 11, 2006]. Retrieved from the Internet: <URL: http://www.snipperoo.com/>. (1 pg).

Final Office Action mailed Jul. 8, 2010 for U.S. Appl. No. 11/682,626, filed Mar. 6, 2007.

International Search Report and Written Opinion for International Application No. PCT/US08/56073, mailed Aug. 8, 2008, 8 pages.

International Search Report and Written Opinion for International Application No. PCT/US08/78744, mailed Jan. 12, 2009, 9 pages.

International Search Report and Written Opinion mailed Aug. 1, 2008 for International Application No. PCT/US08/55756, 7 pages.

International Search Report and Written Opinion mailed Jul. 25, 2008 for International Application No. PCT/US08/55755, 8 pages.

Office Action mailed Jan. 11, 2010 for U.S. Appl. No. 11/682,626, filed Mar. 6, 2007.

Office Action mailed Jul. 7, 2010 for U.S. Appl. No. 11/537,375, mailed Sep. 29, 2006.

Office Action mailed Jun. 18, 2009 for U.S. Appl. No. 11/682,626, filed Mar. 6, 2007.

Office Action mailed Jun. 22, 2010 for U.S. Appl. No. 12/244,606, filed Oct. 2, 2008.

Office Action mailed Jun. 24, 2010 for U.S. Appl. No. 12/043,805, filed Mar. 6, 2008.

Office Action mailed May 21, 2010 for U.S. Appl. No. 11/774,470, filed Jul. 6, 2007.

Office Action mailed Sep. 1, 2010 for U.S. Appl. No. 11/682,639, filed Mar. 6, 2007.

Supplementary European Search Report for European Patent Application No. 07843614.4, mailed Aug. 30, 2010.

Final Office Action mailed Nov. 5, 2010 for U.S. Appl. No. 11/774,470, filed Jul. 6, 2007.

Daniel Salber, Anind K. Dey, Gregory D. Abowd, "The context toolkit: aiding the development of context-enabled applications", Proceedings of the SIGCHI conference on Human factors in computing systems: the CHI is the limit, p. 434-441, May 15-20, 1999 [retrieved from the ACM database on Jun. 15, 2010].

Tody, D. "A portable GUI Development System—The IRAF Widget Server, Astronomicla Data Analysis Software and Systems IV; ASP Conference Series, vol. 77, 1995 [retrieved from the Internet http://articles.adsabs.harvard.edu/cgi-bin/nph-iarticle_query?1995ASPC...77...89T&defaultprint=YES&filetype=.pdf" on Jun. 15, 2010].

Luyten, K., and Coninx, K., Uiml.net: an Open Uimi Renderer for the .Net Framework, in R. Jacob, Q. Limbourg, J. Vanderdonckt (eds.), Proc. of 5th Int. Conf. of Computer-Aided Design of User Interfaces CADUI'2004. Jan. 2004. Information Systems Series, Kluwer Academics, Dordrecht, 2005, pp. 259-270. [retrieved from the internet Jun. 15, 2010].

Office Action maile Dec. 8, 2010 for U.S. Appl. No. 12/043,805, filed Mar. 6, 2008.

Final Office Action mailed Feb. 16, 2011 for U.S. Appl. No. 11/537,375, filed Sep. 29, 2006.

Office Action mailed Jan. 21, 2011 for U.S. Appl. No. 12/043,805, filed Mar. 6, 2008.

Office Action mailed Mar. 16, 2011 for U.S. Appl. No. 12/244,606, filed Oct. 2, 2008.

* cited by examiner

| Widget Container 820 | Placement ID 830 | Processor-Readable Vehicle 840 | Session ID 850 | Widget 860 | Service Module 870 | Tracking Parameter 880 | Widget-Container Attributes 890 |
|---|---|---|---|---|---|---|---|
| A | P1 | URL1 | 1 | W | J | 13 | Size1 |
| A | P2 | URL2 | 2 | W | J | 10 | Size1 |
| A | P2 | URL2 | 3 | W | L | 2 | Size1 |
| B | P3 | URL2 | 4 | Z | J | 1 | Size2 |
| B | P3 | URL2 | 5 | Z | L | 3 | Size2 |
| B | P4 | URL3 | 6 | Z | M | 7 | Size2 |

FIG. 8

METHOD AND APPARATUS FOR WIDGET-CONTAINER HOSTING AND GENERATION

BACKGROUND

The disclosed invention relates generally to distribution of content over a network, and in particular, to containerization of static, media, and/or software objects in a procedural software framework.

The world wide web is a platform that has been used to exchange various forms of content including videos, text, music, etc. Often this content is distributed to users and/or computers in an ad-hoc fashion, for example, using e-mail or as files embedded in a web page. Recently, primitive forms of "viral" distribution or replication of content have been developed that allow users to more easily spread content to other users than previously known ad-hoc methods. Although these primitive methods are more convenient than distributing content in an ad-hoc fashion, they have many shortcomings. For example, they do not provide for the ability to easily add services related to the content and services, if any exist, cannot be dynamically modified. The spreading of content using ad-hoc methods and/or primitive forms of viral spreading cannot be tracked as a service in a useful way. Content also cannot be readily shared with users of different platforms (e.g., personal digital assistant to personal computer). Thus, there is a need for an apparatus and method for combining content with services.

SUMMARY OF THE INVENTION

A method includes receiving at least one of a widget or a reference to a widget, where the widget can be at least one of a static data object, a media object, or a software object. At least a portion of a widget container, which is a procedural software framework containing a service module associated with the widget and the widget, is generated. The service module can be a pre-defined function associated with the widget container before the widget container is generated. The widget container can be configured to be executed at a widget-container processing device in response to a reference to the widget container being accessed from a processor-readable vehicle.

BRIEF DESCRIPTION OF THE DRAWINGS

The present invention is described with reference to the accompanying drawings. In the drawings, identical or like reference numbers indicate identical or functionally similar elements.

FIG. 8 is an example metadata database that illustrates some of the metadata parameters and values that can be generated for and associated with widget containers, according to an embodiment of the invention.

DETAILED DESCRIPTION

Figure 1:
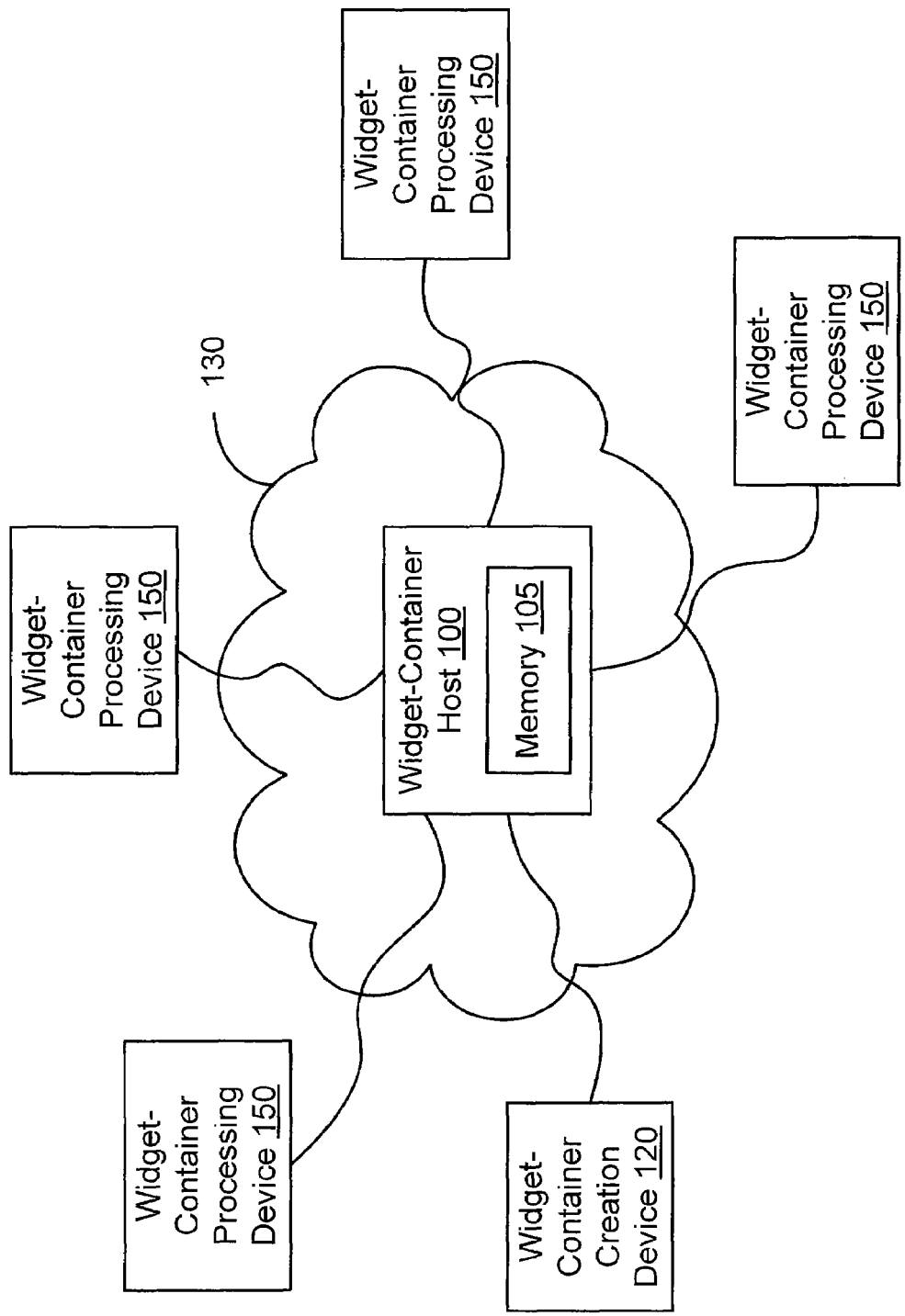
FIG. 1 is a block diagram of a widget-container host connected via a network to several widget-container processing devices, according to an embodiment of the invention.

A widget container (also can be referred to as a container) is a procedural software framework that contains a widget and/or contains at least one service module that can be associated with the widget. As a procedural software framework, the widget container can be a series of instructions that are executable or interpretable by, for example, a computer processor. The widget and/or service module is "contained" in the widget container when a widget and/or service module is either referenced in a widget container or actually integrated into the procedural software framework of the widget container. The widget and/or service module when being contained in the widget container can be referred to as being wrapped or containerized in the widget container.

The widget container is a portable framework that can be embedded in (e.g., referenced using an embed or object tag) and/or accessed from/using a processor-readable vehicle (e.g., webpage). The widget can be any type of object such as a static data object (e.g., text or textual document), media object (e.g., video, mp3, or image), and/or software object (e.g., javascript applet) that can be contained (e.g., integrated or referenced) in the widget container. In many embodiments, the widget and/or the service module (or references to the widget and/or service module) can be referred to as components of the widget container.

The service module (or reference to the service module) contained in the widget container can be a pre-defined and/or customizable (e.g., user-defined) function related to a variety of functions (e.g., tracking, placing) related to the widget container and/or its components. The service module and/or widget can be wrapped in the container, for example, at the time that the widget container is first generated, after the widget container has been generated, and/or dynamically when the widget container is being served. The widget container can be created using a widget generation engine that is implemented in hardware and/or software (e.g., using a user-interface). In some embodiments, the widget-container generation engine can be included in a widget-container host and/or a widget-container creation device. In some embodiments, the widget container can be dynamically modified using dynamic injection (i.e., injecting data into the widget container just before/when the widget container is served).

Dynamic injection is discussed in more detail in connection with tracking parameter values and in connection with FIG. 4.

The widget container can be sent from a widget-container host to a widget-container processing device such as, for example, a computer or mobile phone when a reference to the widget container is accessed from, for example, a webpage. The widget container can be executed on various platforms and instances of references to the widget container can be included in and/or spread to a variety of processor-readable vehicles that can be read using various widget-container processing devices. Also, metadata can be associated with the widget container and/or a component of the widget container (e.g., widget), so that the widget container and/or component of the widget container can be, for example, dynamically customized and/or tracked.

Referring now to the drawings, FIG. 1 is a block diagram of a widget-container host 100 connected via a network 130 to several widget-container processing devices 150. The widget-container host 100 is a centralized management component that controls, configures, and coordinates the sending of widget containers to the container processing devices 150. For example, an instance of a widget container that is stored at the widget-container host can be sent from the widget-container host 100 to one or more of the widget-container processing devices 150 in response to one or more requests for the widget container received from the widget-container processing devices 150. A widget container is a procedural software framework that contains a widget and/or a service module. In some embodiments, the service module can be associated with the widget.

Each of the widget-container processing devices 150 can be any type of device that is configured to process the widget container and a widget and/or service module that can be contained in the widget container. Each of the widget-container processing devices 150 can be, for example, a computer, a mobile phone, a personal digital assistant (PDA), and/or a server. The widget container can be configured so that the widget container can be processed by each of these widget-container processing devices 150 even though the platforms (e.g., hardware, architecture, software, operating system, runtime libraries, programming languages) of the respective widget-container processing devices 150 may be different. The network 130 can be any type of network such as a local area network (LAN) and/or a wide area network (WAN) implemented as a wired and/or wireless network in a variety of environments such as, for example, an office complex.

The widget-container host 100, in response to a request to access, modify, and/or define a widget container, retrieves a widget container from a memory 105 where one or more widget containers are stored. The memory 105 can be, for example, a database included in the widget-container host 100. In some embodiments, the widget container can be stored in and accessed from a memory device such as a database that is a remote database and/or a distributed database that can be accessed by the widget-container host 100 via network 130 or via a separate network (not shown).

In this embodiment, a widget that is contained (e.g., referenced or integrated) in the widget container is stored in and served from the memory 105 of the widget-container host 100 to one of the widget-container processing devices 150. In other words, the widget container and/or the components of the widget container are stored in the memory 105 and sent to a widget-container processing device 150 over the network 130 in response to a request for the widget container from the widget-container processing device 150. In many embodiments, a widget container served from the widget-container host 100 can contain a reference to one or more widgets that are served from, for example, a widget server (not shown). Likewise, in some embodiments, a widget container served from the widget-container host 100 can contain a reference to one or more service modules that are served from, for example, a service module server (not shown). The widget server and/or service module server can be connected to the widget-container processing devices 150 and/or widget-container host 100 via network 130 or via a separate network (not shown).

The memory 105, in some embodiments can also be configured to store metadata parameters and metadata parameter values (e.g., tracking parameter values) associated with widget containers and/or a component of the widget container (e.g., widget or service module). The metadata parameters and values can be used to, for example, dynamically customize or track the widget container and/or the component of the widget container. Metadata parameter value storage, manipulation, and usage are described in more detail in connection with FIGS. 8-11.

FIG. 1 also shows that a widget-container creation device 120 can be connected to the container host 100 via network 130. The widget-container creation device 120 can be used to generate, define, and/or modify a widget container. The widget-container creation device 120 can be, for example, a personal computer, a mobile device (e.g., mobile phone and/or PDA), and/or a server. In some embodiments, the widget-container creation device 120 can be configured to automatically generate and/or modify widgets containers, for example, when a widget is received. In many embodiments, the widget-container creation device 120 can also store widgets and function as a widget server. Each of the widget-container processing devices 150 can also be configured to function as a widget-container creation device 120 and vice versa.

The widget-container creation device 120 can trigger the generation and/or modification of the widget container at the widget-container host 100. In some embodiments, the widget-container creation device 120 can send an instruction from, for example, a processor (not shown) to cause the widget-container host 100 to generate and/or modify a widget container.

The widget-container creation device 120 can also be configured to locally define, generate, and/or modify the widget container. In some embodiments, the widget-container creation device 120 can access a user-interface served by the widget-container host 100 that can be used to define a widget container. The user-interface can be, for example, a widget-container generation engine served from an application server (not shown) controlled and/or integrated into the widget-container host 100 and accessed using a web browser.

If the widget container is generated at the widget-container creation device 120 using, for example, a locally executed widget-container generation engine, the widget container can be sent to the widget-container host 100 for storage and distribution to one or more of the container processing devices 150. The widget container can also locally modify the widget-container creation device 120 by, for example, receiving the widget container from the widget-container host 100, modifying the widget container locally, and sending the widget container back to the widget-container host 100. More details related to the generation and modification of a widget container are described in connection with FIG. 3 and FIG. 10, respectively.

Although in this embodiment, the widget-container host 100 is a centralized control/storage mechanism that manages requests received from container processing devices 150 and manages the sending of widgets containers (e.g., prompts a separate device (not shown) to send a widget container stored in a separate database (not shown)), the functionality of the widget-container host 100 can be decentralized and/or distributed. For example, a hierarchy of widget-container hosts 100 can be arranged, for example, with management components and/or slave components that control, configure, and coordinate the sending of widget containers to the widget-container processing devices 150.

Figure 2:
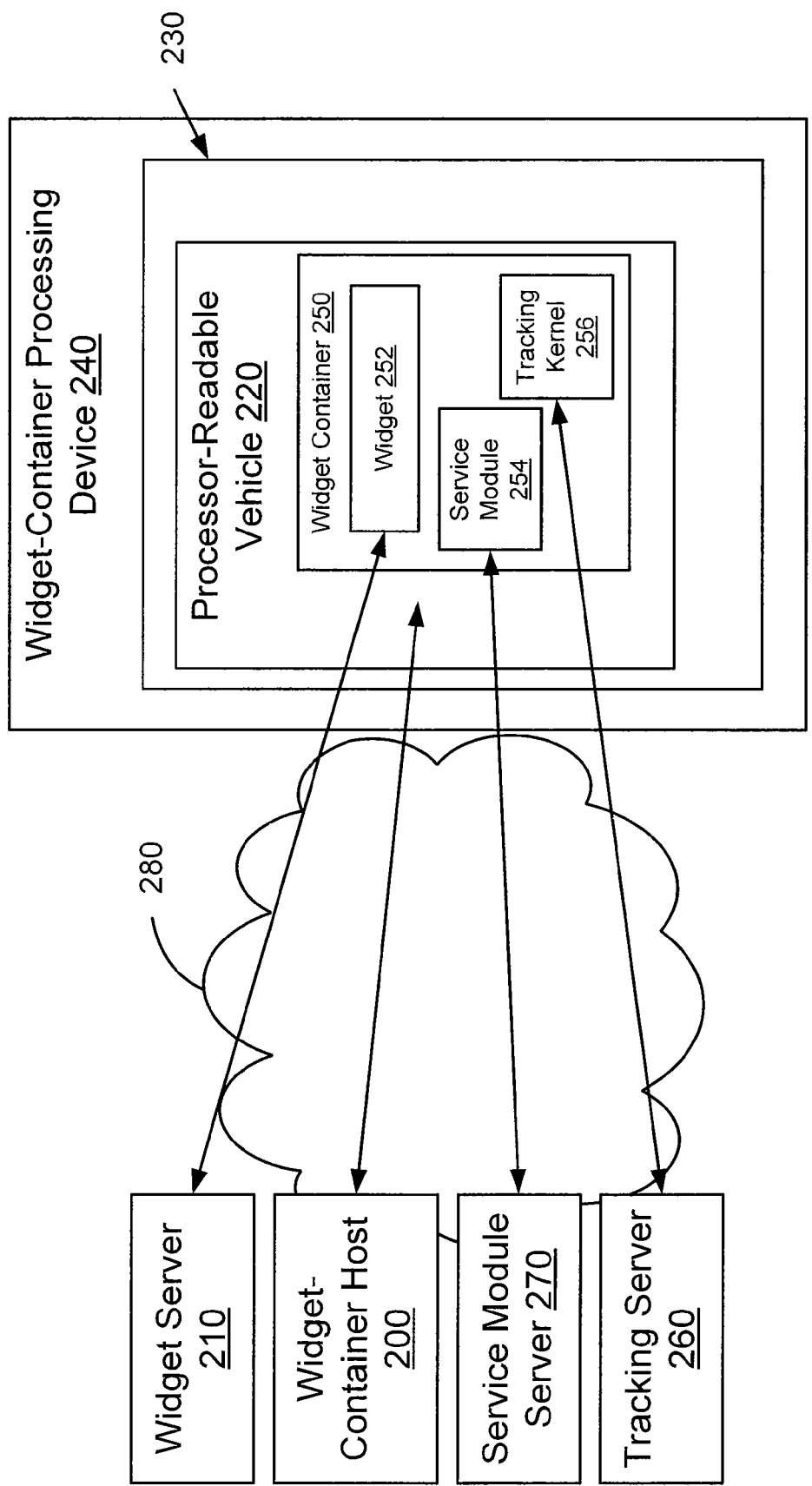
FIG. 2 is a schematic diagram illustrating a widget container being executed/displayed within a framework of a processor-readable vehicle, according to an embodiment of the invention.

FIG. 2 is a schematic diagram illustrating a widget container 250 executing within a framework of a processor-readable vehicle 220 and/or being displayed on a display 230 of a container processing device 240, according to an embodiment of the invention. The widget container 250 includes a widget 252 served from a widget server 210 over a network 280 to the container processing device 240 for, for example, display within the procedural software framework of the widget container 250. The widget 252 is served to the container processing device 240 and displayed/executed within the widget container 250 in response to a reference to the widget 252 being accessed from the widget container 250. In some embodiments, the widget container 250 is a Flash object and the processor-readable vehicle 220 is a Flash-enabled web browser.

The widget 252 can be categorized into one of three categories of widgets, static data objects, software objects, and media objects. Within each category, the widget can be a specific content type. For example, the widget 252 can be an executed (e.g., played) or a displayed media object such as a video file (i.e., a video content file), an mp3 file (i.e., audio content file), or an image file (i.e., image content file). The widget 252 can be a static data object that is, for example, displayed within the widget container 250. The static data object can be, for example, a textual object such as a set of letters, a textual document, or an html based textual document. The static data object can include, for example, links to other widgets (not shown). The widget 252 can also be a software object such as an executable application or set of instructions that is executed within the procedural software framework of the widget container 252. The results of the executable application can be included and/or displayed within the procedural software framework of the widget container 250. The widget container 250 can be configured so that the widget 252 can be executed/displayed in any portion of the widget container 250 when the widget container 250 is displayed on the display 230.

In some embodiments, the widget 252 can be modified for display/execution within the widget container 250. For example, the dimensions of an image object can be modified by, for example, metadata parameter values defined within or used to define the widget container 250. In some embodiments, the widget container 250 can be configured so that the executing/display of the widget 252 within the widget container 250 is performed at specified times. For example, the display of the widget 252 can be delayed or performed at a certain time in response to an instruction triggered by a user, for example, through the service module 254.

The widget container 250 is served to the container processing device 240 from a widget-container host 200 when a reference to the widget container is accessed/read from the processor-readable vehicle 220. In many embodiments, the widget-container 250 is automatically executed when received at the widget-container processing device 240. The reference can include a pointer to the widget container 250 (e.g., pointer to unique ID associated with the widget container 250). An instance of a reference to the widget container 250 can be included in any portion of the processor-readable vehicle 220.

In many embodiments, the processor-readable vehicle 220 is a readable framework that can be used to describe a structure for displaying information without being executed as a series of instructions such as a hyper-text markup language (html) web-page or a wireless application protocol (WAP) site. If the processor-readable vehicle 220 is a web-page, the reference can be, for example, an embed tag or an object tag that serves as a link to the widget container 250.

The procedural software framework that makes up the widget container 250 can be programmed in any number of programming languages that are compiled (e.g., C++) and/or in programming languages that are interpreted (e.g., Javascript). An executable portion (of the procedural software framework) that manages and controls the service module(s) 254 and/or widget(s) 252 included in the widget container 250 can be referred to as the core of the widget container 250. Metadata parameter values can be passed to the widget container 250 and used by, for example, the core of the widget container 250 to modify, for example, attributes of the widget container 250 (e.g., x, y location of the widget 252, size of the widget 252, color, themes, styles, etc.).

The service module 254 included in the widget container 250 can be a pre-defined function associated with one or more widgets 252, another service module (not shown), and/or the widget container 250. For example, the service module 254 can be a metadata searching/retrieval function, a polling/categorizing function, a widget container deployment function (e.g., using a placement service module), a transaction service function (e.g., service module for facilitating a web purchase, service module used for signing a user up for a web service, etc.), a security function (e.g., security firewall function), and/or a widget container tracking function. The service module 254 can also be a referral service function (e.g., a service used to refer a viewer to a widget container), an advertisement service function (e.g., a service module that includes an advertisement), or a directory service function (e.g., a service module used for searching in a directory).

In this embodiment, the service module 254 is served from a service module server 270 in response to a reference to the service module 254 being accessed/read from the widget container 250. In some embodiments, the service module 254 is an integrated component of the widget container 250 (e.g., compiled within the widget container 250). In some embodiments, the service module 254 and/or widget 252 can be stored on and dynamically served from the widget-container host 200 when the widget container 250 is requested. The widget-container host 200 can also be configured to prompt the widget server 210 and/or service module server 270 to send the widget 252 and/or the service module 254 to the container processing device 240 when a request for the widget container 250 is received from the container processing device 240.

Although this figure shows only a single service module 254 and a single widget 252, multiple service modules 254 and/or widgets 252 can be integrated into and/or referenced within a widget container 250. The widget(s) 252 and/or service module(s) 254 can be configured to interact with one another.

In many embodiments, the service module 254 can be configured with a pre-defined functionality/feature that cannot be modified (e.g., an e-mail distribution service module). The pre-defined features can be referred to as components. In some embodiments, the service module 254 can be a pre-defined service module 254 that includes a finite set of pre-defined options/features that can be selected by a user. For example, the service module 254 can be a security service module that has a pre-defined set of security levels that can be selected for use within a widget container.

In some embodiments, a pre-defined option within the service module 254 can be used to customize the service module 254. For example, a pre-defined service module 254 can include a pre-defined feature that allows a user to select a certain theme or color scheme for the service module 254.

The service module 254 can also have a set of pre-defined features that can receive customizable (e.g., unique) information. For example, the service module 254 can be configured so that the service module 254 can accept and use information input by a user such as an e-mail address. If the service module 254, for example, is configured to provide weather information to a user viewing the widget container 250, the service module 254 can be configured to accept location information (e.g., zip code) so that a weather forecast that is of interest to the user can be provided by the service module 254.

In some embodiments, the service module 254 can be a service module 254 created by and selected for use in the widget container 250 by a user. In other words, a user can define a user-created service module 254 that is not selected from a library of pre-defined service modules 254. The user-created service module 254 can have a unique functionality and can be wrapped into the widget container 250.

In some embodiments, the service module 254 can be a security service module that can function as a widget firewall. For example, if the widget container 250 is configured to be executed using, for example, a flash player, the widget container 250 can be configured to intercept network calls before the flash player executes them. The widget container 250 can provide a single point of entry into, for example, external javascript calls, and thereby filter them according to a policy implemented by, for example, the widget-container host 200. The widget-container host 200 can also be configured to write payloads (e.g., secret keys, sessions ID's, or one-time pads) into the widget container 250 when it is served/executed to facilitate secure communication.

Widget container 250 can also include a tracking kernel 256 configured to perform a tracking function. The tracking kernel 256, which can also be referred to as a tracking module, can be embedded/integrated in (e.g., programmed within) the procedural software framework of the widget container. The tracking kernel 256, in many embodiments, is not displayable on the display 230. The tracking kernel 256 and/or features associated with the tracking kernel 256 can also be contained in the widget container 250 as a service module 254.

The tracking kernel 256 can be used to collect tracking parameter values related to user-triggered interactions with the widget container 250 such as basic mouse movement and clock events. For example, the tracking kernel 256 can be configured to count the number of times that a user (e.g., viewer of the widget container 250) moves a mouse over a particular widget 252 or service module 254. The tracking kernel 256 can also be configured to track impressions, widget container visitor profiles, domain names of the processor-readable vehicle 220, container processing device 240 information such as browser type and operating system type.

The tracking kernel 256 can also be used to collect tracking parameter values related to placement information such as, for example, what webpage (e.g., processor-readable vehicle 220) a widget container is referenced and/or placed on, where on the page it was placed, and/or size of the widget container 250 (e.g., dimensional and memory). In some embodiments, the tracking kernel can be coupled with a supporting javascript library.

Tracking parameter values collected using the tracking kernel 256 can be sent as, for example, a serialized string of data (or packets) and/or as one or more bursts of tracking packets to a tracking server 260 that can be configured to collect/store tracking parameter values. In some embodiments, the tracking parameter values can be sent to the widget container host 200 for storage in a metadata database (not shown) as metadata. The widget container host 200, in some embodiments, can include the functionality of the tracking server 260.

In some embodiments, the widget container 250 can be configured to transmit tracking parameter values to a certain tracking server 260 while another widget container can be configured to transmit tracking parameter values to a different tracking server (not shown). These configurations can be implemented dynamically (e.g., using dynamic injection techniques) when the widget containers are served. The tracking parameter values can be allocated to these different tracking servers based on, for example, widget container type, tracking information, etc. In some embodiments, a single widget container such as widget container 250 can be configured to transmit a first type of tracking parameter value to tracking server 260 and a second type of tracking parameter value to a different tracking server (not shown).

The tracking parameter values that can be collected when a widget container 250 is being executed can be transmitted from the widget container 250 at various times and using various combinations of methods. For example, the tracking parameter values can be continually transmitted (e.g., streamed) and/or transmitted when the widget container is closed (e.g., no longer being executed). In some embodiments, tracking parameter values are stored using the tracking kernel 256 (or tracking service module) and transmitted to, for example, the tracking server 260 at periodic intervals and/or random intervals (e.g., transmitted in random and/or periodic bursts). The tracking parameters values can be transmitted from the widget container 250 when a specified threshold of tracking parameter values has been collected and/or when a cache that temporarily stores the tracking parameter values reaches a threshold capacity value.

In some embodiments, the tracking of data using the widget container 250 can be throttled on a per-widget container basis to prevent, for example, overly popular widget containers from flooding, for example, the widget container host 200 (or tracking server) with tracking packets and/or tracking parameter values. The tracking kernel 256 can be throttled according to a tracking service level that indicates, for example, that only certain numbers and/or types of user-triggered interactions should be tracked for, for example, widget container 250.

The tracking service level can be dynamically injected into, for example, widget container 250 using a dynamic injection technique. For example, the tracking kernel of widget container 250 can be configured to request a tracking service level from, for example, the widget-container host 200. The widget container 250 can dynamically load (e.g., just before the widget container 250 is served to the widget-container-processing device 240) the tracking service level represented by an image/data (e.g., composite bit field) with a defined width and height. An image of one size can trigger the tracking kernel 256 of the widget container 250, for example, to be turned off altogether. Other image sizes can enable or disable behavioral tracking, placement tracking, etc. in any combination. Tracking kernels 256 associated with different widget containers 250 can be individually configured dynamically on an instance by instance basis to minimize load and bandwidth cost where necessary as determined by, for example, threshold conditions. In some embodiments, the widget-container host 200, for example, can proactively dynamically inject data into the widget container 250 based on a policy without the data first being requested by the widget container 250.

In some embodiments, the widget container 250 can include one or more other widget containers (not shown). The one or more other widget containers can be referenced in the widget container 250. In some embodiments, the tracking data can be associated, for example, with a unique identifier (e.g., globally unique identifier (GUID)) associated with a specific widget container. The association of tracking data with the widget container (and other metadata parameter values) is discussed in more detail in connection with FIG. 8.

Figure 3:
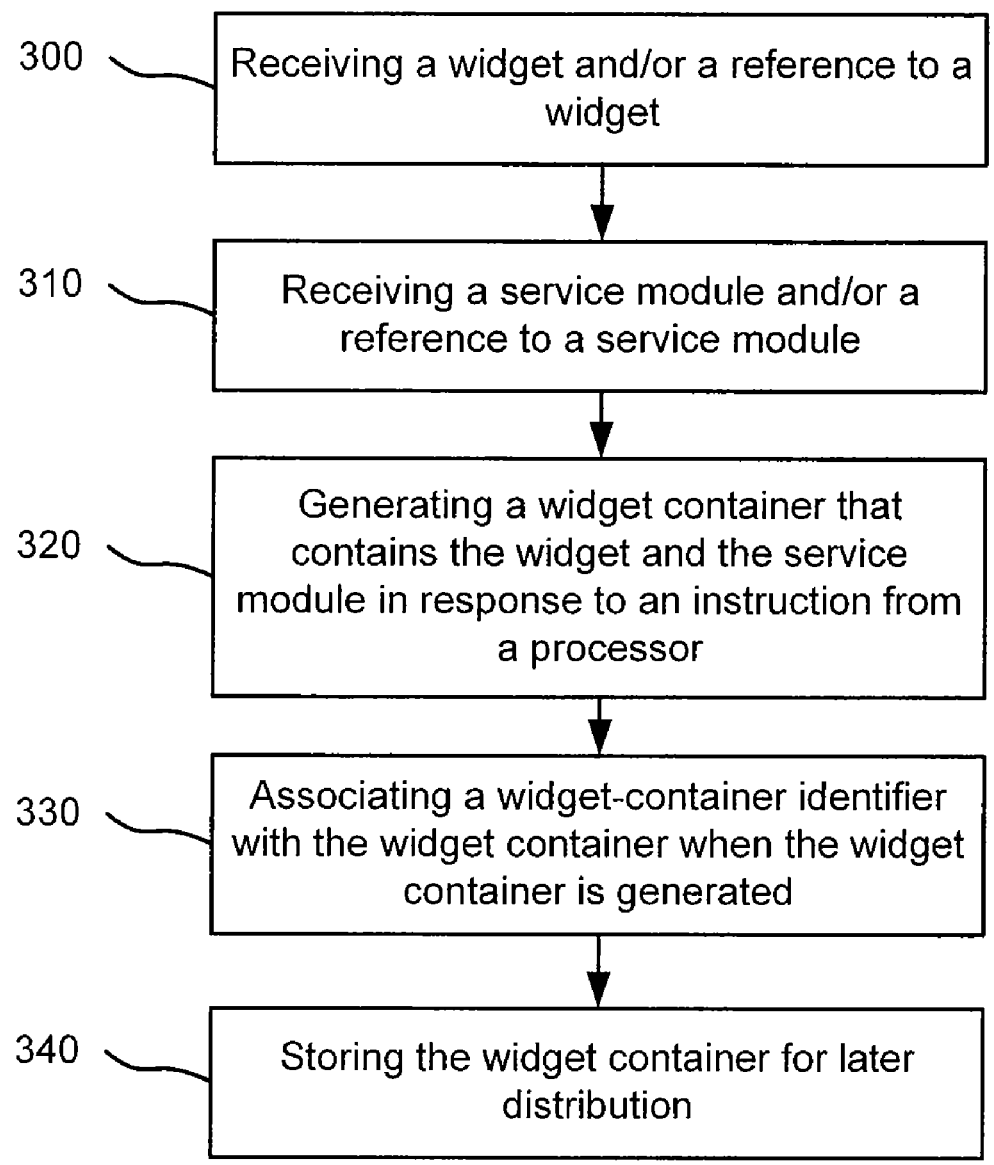
FIG. 3 is a flow chart that illustrates a method for generating a widget container, according to an embodiment of the invention.

FIG. 3 is a flow chart that illustrates a method for generating a widget container, according to an embodiment of the invention. The method of generating a widget container by including a reference to a widget and/or a reference to a service module or integrating a widget and/or service module in a procedural software framework can be referred to as wrapping or containerization.

The flow chart shows that a widget and/or a reference to a widget is received at 300. If the widget container is being generated using, for example, a widget-container generation engine at a widget-container generation host, the reference to the widget and the reference to the service module can be selected and/or provided to the widget-container host via a user-interface used to define a widget container. The widget container user-interface can be linked to or can be a component of the widget-container generation engine. The user-interface can include for example, a field that allows a user to select (e.g., using a "browse" button) and/or input a reference to the widget to be added to the widget container.

In some implementations, the user-interface can be provided via an application server controlled by the widget-container host. In some embodiments, the user-interface can be associated with a remote server (e.g., separate computer/server) that is configured to cause a generation engine associated with a separate widget-container generation host to generate the widget container in response to, for example, an application program interface (API) call. In some embodiments, a computer/server can be configured to automatically (or in response to an instruction from a user) send an API call to cause a remote widget-container generation host to generate a widget container.

The flow chart shows that a service module and/or a reference to a service module is then received at 310 by, for example, a device configured to define the widget container (e.g., a centralized widget-container host or a widget-container creation device) using, for example, a widget-container generation engine. Similar to the reference to the widget, the reference to the service module can be selected and/or provided using a user-interface configured for defining a widget container.

In many embodiments, the user-interface can be configured to provide a set of pre-defined service modules that can be selected by a user for containerization in a widget container. The set can be an entire library of service modules or a selected set of service modules from a library of pre-defined service modules. For example, a user can be prompted via the user-interface to select one of two possible service modules for containerization in the widget container. In some situations the user can be provided with an option not to include a service module in the widget container. The library of service modules can be stored in a location where a service module (or reference) selected from the library of service modules can be accessed for wrapping in the widget container when the widget container is generated.

In some embodiments, a set of service modules can be selected/defined based on a library of service modules based on a policy or a threshold condition. For example, a policy can be created such that only a certain type of service module (e.g., polling type service modules) be allowed as an option for containerization in a widget container for a particular user or group of users. In some embodiments, a user and/or group of users can be limited to a certain number of service modules based on a threshold condition. If the widget container is to be generated using a widget-container host in response to a definition provided via a user-interface, the policy can be stored on and enforced by the widget-container host via the user-interface.

In some embodiments, the policy used to define a set of service modules can be dependent on the type of the widget being containerized. For example a certain set of service modules can be allowed for containerization in a widget container based on the widget being a video content widget. A different set of service modules can be provided to a user for containerization in a widget container based on the widget being an audio content widget.

In some embodiments, a reference (e.g., link) to a user-created service module can be provided by the user to, for example, a widget generation engine via a user-interface so that the user-created service module can be wrapped into the widget container. In some embodiments, a user (or computer system) can be restricted from providing a reference to a user-created service module for wrapping (i.e., containerization) in a widget container. A user can be allowed, in some embodiments, to insert a user-created service module only when the user has been authenticated and/or the user-created service module has been approved for use in the widget container. The user-created service module can be approved based on a policy that is, for example, included in and enforced by a widget-container generation engine.

In some embodiments, the service module can be explicitly associated with the widget because the service module performs a function related to the widget. For example, the service module can be a polling service module that is used to collect a user's opinion of a widget. As another example, the service module can be a service module that modifies, for example, the display and/or execution of the widget. The widget can be associated with the service module when the service module is selected and/or provided to a widget-container generation engine. The service module can be explicitly associated with the service module or automatically associated with the widget.

After the widget and/or reference to the widget is received at 300 and the service module and/or reference to the service module are received at 310, a widget container that contains the widget and the service module is generated in response to an instruction from a processor at 320. The widget container is a procedural software framework that can be generated as a set of instructions in any number of programming languages that are compiled (e.g., C++) and/or in programming languages that are interpreted (e.g., Java). If the widget container is generated using a set of instructions in a compiled programming language, the generating can include compiling the widget container.

The instruction to generate the widget container can be received from a processor in, for example, a widget-container generation host or a widget-container creation device. In some embodiments, the instruction to generate the widget container can be prompted via a user-interface that is associated with a widget generation engine. For example, the user-interface can include a button, that when selected at a remote PDA of a user, triggers the generation of the widget container at a widget-container generation host.

A core of the procedural software framework of the widget container manages and controls the service module and/or the widget that is contained in the widget container. The widget container can be configured so that metadata parameter values can be passed to the widget container and used by, for example, the core of the widget container to modify, for example, the general layout (e.g., x, y location and size of the widget) and/or attributes of the widget container (e.g., color, themes, styles, etc.). The metadata parameter values can be stored at and accessed from, for example, a memory associated with a widget-container generation host.

When the widget container is generated, a widget-container identifier is associated with the widget container at 330. The widget-container identifier can be an identifier used to uniquely identify the widget container for later retrieval. In some embodiments, the widget container identifier can be, for example, a GUID or an identifier derived from a GUID. The widget is stored for later distribution at 340 on, for example, a widget-container host.

In some embodiments, a widget container can be automatically generated by a separate computer and/or server. Also, in some embodiments, the steps identified in FIG. 3 can be performed in a different order. For example, a widget can be received before a service module is received.

In some embodiments, different parts of the flow chart can be performed on difference devices. For example, the generating can be performed on a widget-container generation host while the associating can be performed on a different device such as a widget-container creation device. Also, in some embodiments, the widget container can be generated to contain only a service module or a widget.

Figure 4:
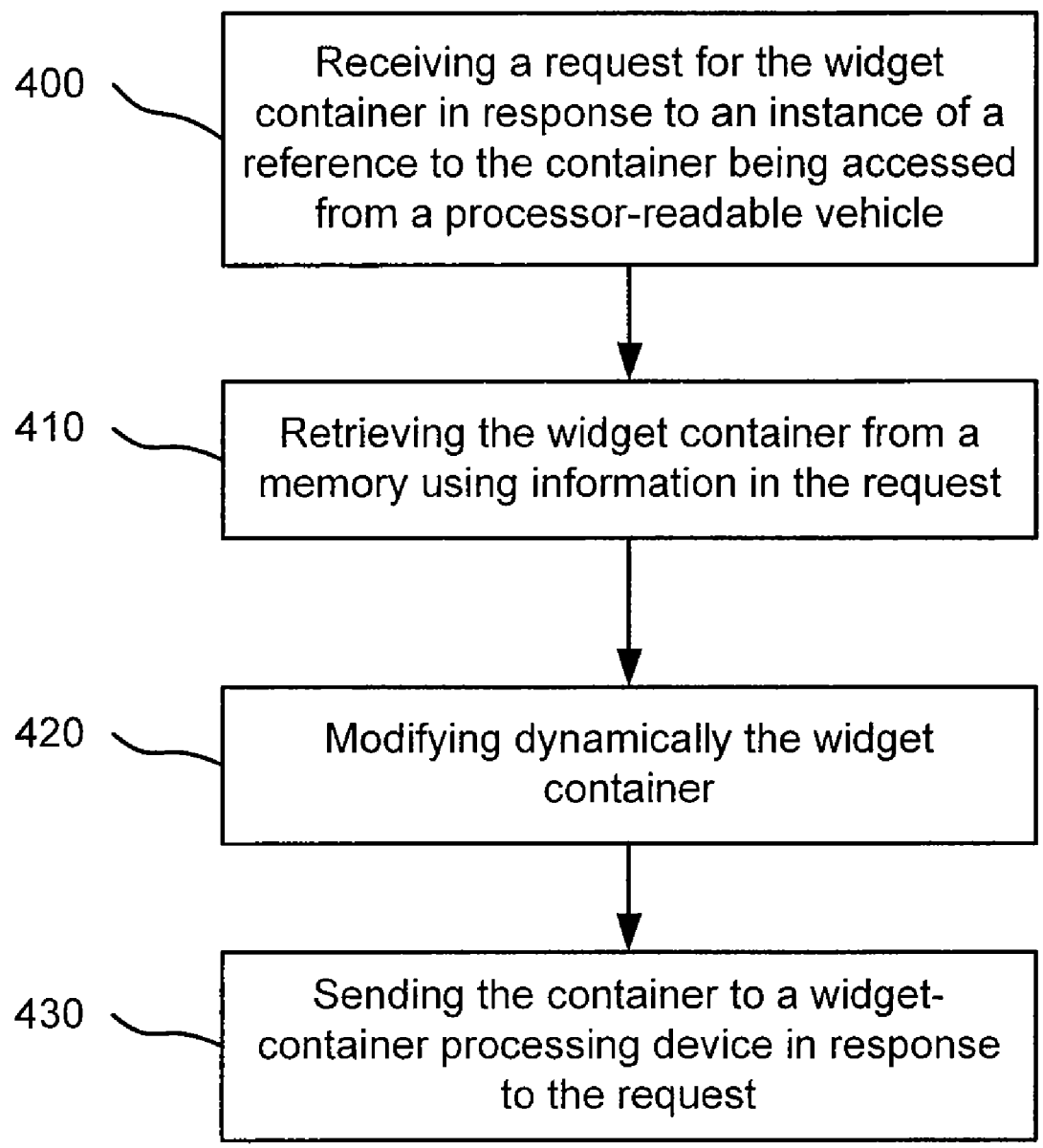
FIG. 4 is a flow chart that illustrates a method for sending a widget container to a container processing device, according to an embodiment of the invention.

FIG. 4 is a flow chart that illustrates a method for sending a widget container to a widget-container processing device, according to an embodiment of the invention. The flow chart shows that a request for the widget container is received in response to an instance of a reference to the widget container being accessed from a processor-readable vehicle at 400. The request can be defined, for example, when the reference is accessed/read from the processor-readable vehicle at a widget-container processing device. The request can include information from the reference such as a pointer to a unique identifier that can be used to identify the widget container that is being requested. In some embodiments the pointer is a link that can be used to retrieve the widget container or is a widget-container identifier that can be used to identify the widget container. If the processor-readable vehicle is a webpage, for example, the reference can be an embed tag or an object tag that serves as a link to the widget container.

Using the information in the request, the widget container is retrieved from a memory at 410. The widget container is, in many embodiments, retrieved so that the widget container can later be sent/served to a container-processing device. For example, the request for a widget container can be received at a widget-container host and the widget container can be retrieved from a memory of the widget-container host based on the request.

In some embodiments, the widget container can be dynamically modified at 420 before the widget container is sent/served at 430. For example, data can be dynamically injected into the widget container and used by the widget container to customize, for example, a service module of the widget container (e.g., customize a tracking feature). The data can be, for example, a segment of data that replaces a known segment of data within the widget container. The data can trigger, as another example, the disabling of a service module within the widget container. The widget container can, in some embodiments, be configured to search for and/or request the data before the widget container is served. The data can, in some embodiments, be metadata that is defined by a widget-container originator (e.g., creator or owner), a widget-container placer and/or a widget-container viewer and can be stored at, for example, a widget-container host. In some embodiments, a widget-container host can, for example, dynamically inject data into a widget container based on a policy.

The widget container can be sent to a widget-container processing device in response to the request at 430. The sending can also be referred to as serving. For example, if the request is received from a widget-container processing device such as a mobile phone, the widget container is retrieved and sent to the mobile phone for processing and/or display. In some embodiments, the widget container is compiled when served. The widget container can also be generated (or regenerated) when served. In many embodiments, the device that requests the widget container will also be the same device that receives the widget container for processing and/or display.

The widget container can be configured so that instances of the widget container can be sent to two or more different widget-container processing devices that each operate based on a different platform. For example, an instance of the widget container can be sent to and executed within a first processor-readable vehicle on a mobile phone and sent to and executed within a second processor-readable vehicle on a personal computer. In some embodiments, the first processor-readable vehicle and the second processor-readable vehicle can be two different instances of the same processor-readable vehicle.

Figure 5:
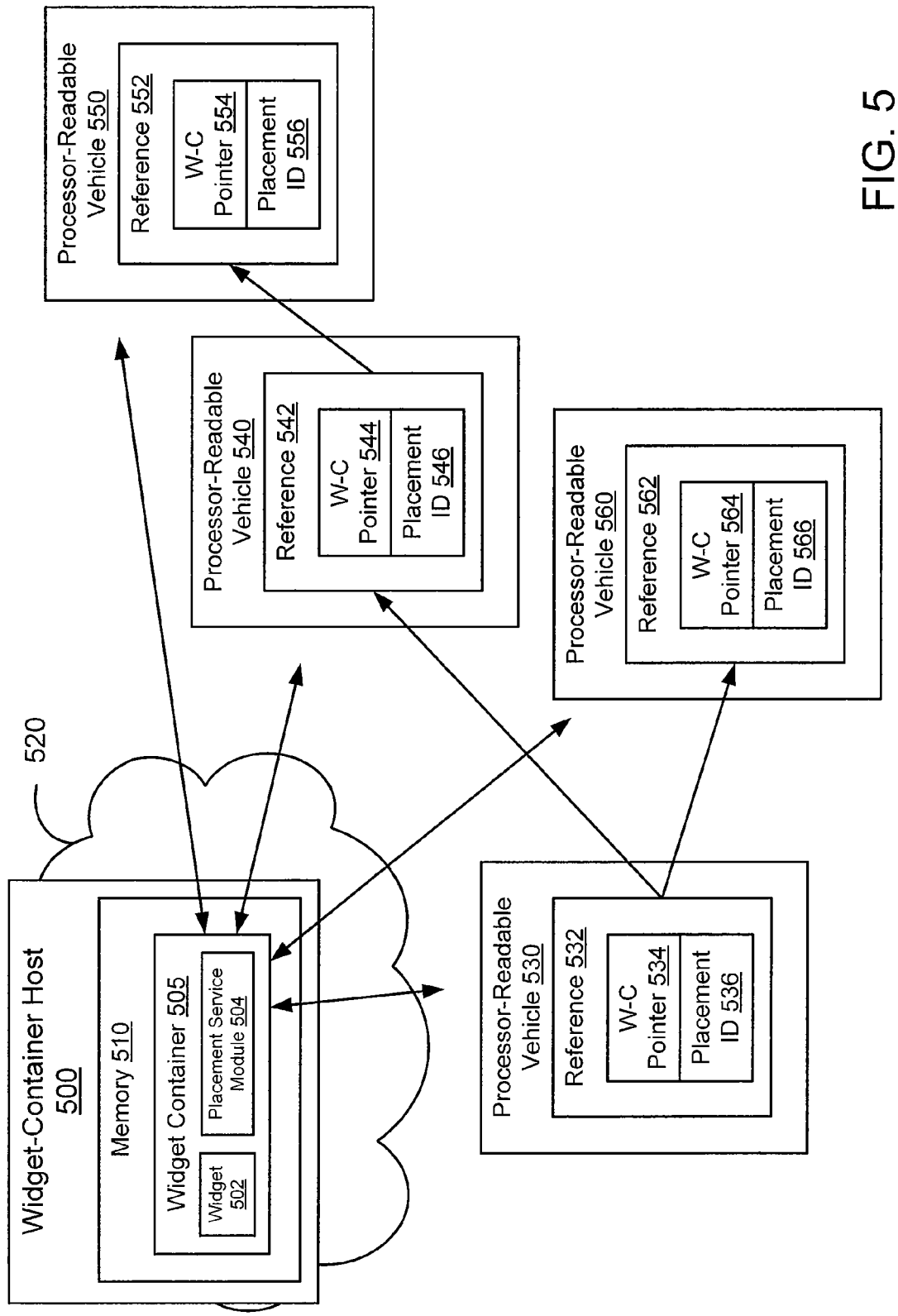
FIG. 5 is a schematic diagram that illustrates a widget-container host sending instances of a widget container for execution within several processor-readable vehicles, according to an embodiment of the invention.

FIG. 5 is a schematic diagram that illustrates a widget-container host 500 sending instances of a widget container 505 for execution within the framework of several processor-readable vehicles 530, 540, 550, and 560, according to an embodiment of the invention. The widget container 505 is sent from a memory 510 of the widget-container host 500 over a network 520.

Each of the processor-readable vehicles, 530, 540, 550, and 560, include a reference, 532, 542, 552, and 562, respectively, to the widget container 505. Each of the references 532, 542, 552, and 562 can be referred to as an instance. Reference 532 (as an example of the references 532, 542, 552, and 562 included in the processor readable vehicles, 530, 540, 550, and 560, respectively) includes a widget-container (W-C) pointer 534 and a placement identifier (ID) 536. The widget-container pointer 534 is a pointer that is used to identify and request the widget container 505 from the widget-container host 500. The placement ID 536 is used to uniquely identify the placement of reference 532 (instance 532) in processor readable vehicle 530. When one of the references, 532, 542, 552, and 562, is accessed from its respective processor readable vehicle, 530, 540, 550, and 560, at a widget-container processing device (not shown) an instance of the widget container 505 can be sent to the respective processor readable vehicle, 530, 540, 550, and 560.

The arrows between the references, 532, 542, 552, and 562, indicate a parentage of the references, 532, 542, 552, and 562. For example, the arrow between reference 532 in processor-readable vehicle 530 and reference 542 in processor-readable vehicle 540 indicates that reference 542 was derived from reference 532. Likewise, reference 552 in processor-readable vehicle 550 was derived from reference 542 in processor-readable vehicle 540.

The placement ID's, 536, 546, 556, and 566, associated with the references, 532, 542, 552, and 562, respectively, can be associated with one another as parentage information. Reference 542 (and placement ID 546), for example, can be identified as a child reference to reference 532 (and placement ID 536) in, for example, a parentage table.

In some embodiments, the placement ID's, 536, 546, 556, and 566, can be generated using a placement service module 504 included in the widget container 505. When the widget container 505 is executed within processor-readable vehicle 530, for example, after being received at processor-readable vehicle 530 in response to reference 532 being accessed, the placement service module 504 can be used to place an instance of reference 532 in processor-readable vehicle 540. The placement service module 504 can also be used to generate placement ID 546 that identifies the placement of the new instance of the reference 542 within the processor-readable vehicle 540. The placement service module 504 can send an indicator that associates placement ID 536 with placement ID 546. This association can be stored at, for example, the widget-container host 500 and used as parentage information to identify that the instance of the reference 542 was derived from reference 532.

The parentage information can be used to associate tracking parameter values associated with instances of widget containers to create collective tracking parameters. For example, tracking parameter values associated with an instance of the widget container 505 sent to processor-readable vehicle 540 and an instance of the widget container sent to processor-readable vehicle 550 can be statistically combined/compiled (e.g., averaged, summed) and stored in, for example, a metadata database. The tracking parameter values associated with each of the instances of widget container 505 can be associated using parentage information. Tracking parameter values of multiple instances of the widget container 505 sent to a single processor-readable vehicle such as, for example, processor-readable vehicle 530 at different times can also be statistically combined and/or compiled. In some embodiments, collective tracking parameters can be used for monetization purposes.

In some embodiments, the placement ID's, 536, 546, 556, and 566, can be stored in, for example, a metadata database such that the placement ID's, 536, 546, 556, and 566, can be associated with their respective processor readable vehicles, 530, 540, 550, and 560, even if, for example, an identifier associated with any one of the processor readable vehicles, 530, 540, 550, and 560, changes. For example, if processor readable vehicle 550 is a webpage, the placement ID 556 can be associated with each web address that can be used to request processor-readable vehicle 550.

Figure 6:
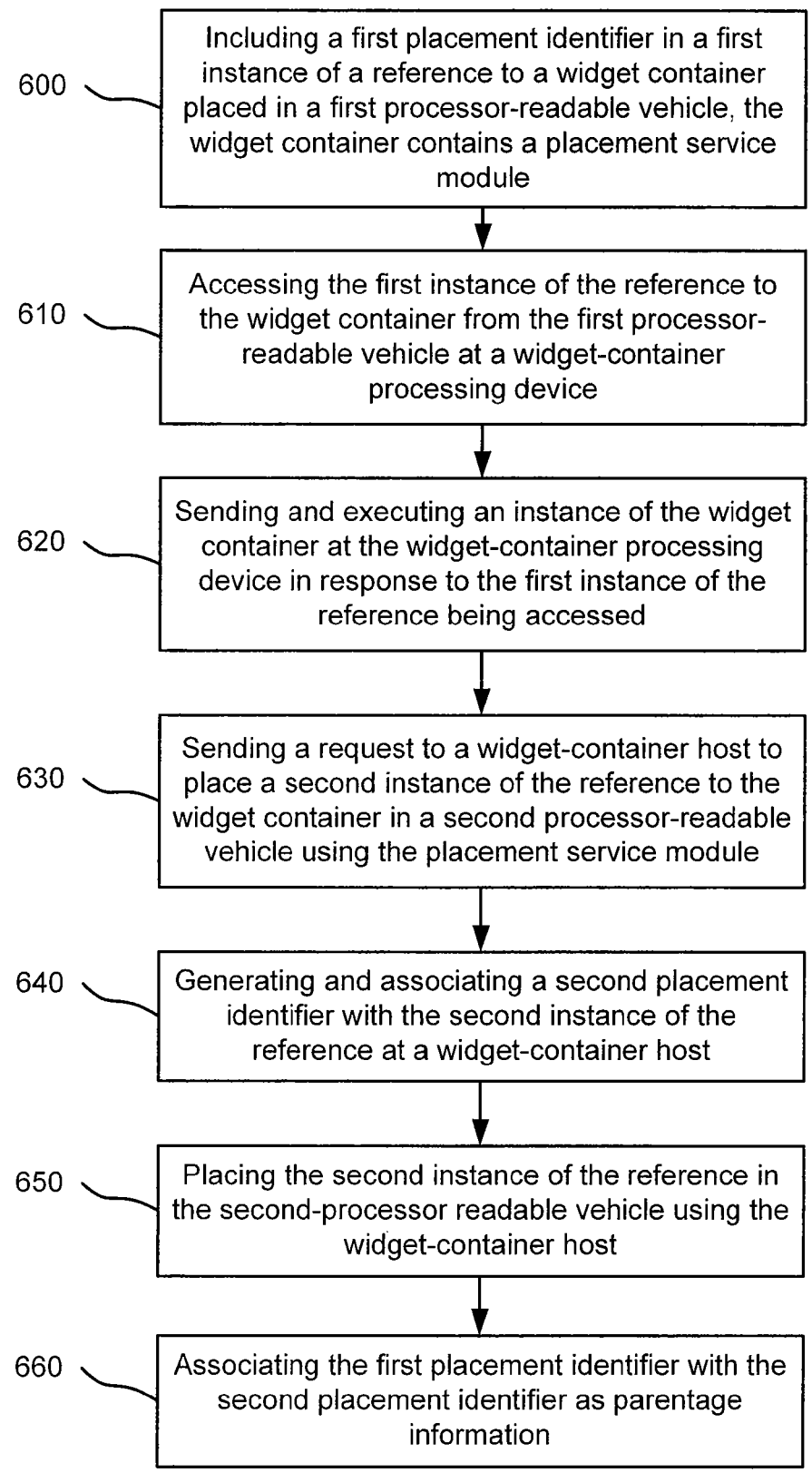
FIG. 6 is a flow chart that illustrates an example method for placing a reference and generating a placement identifier that can be used to generate parentage information, according to an embodiment of the invention.

FIG. 6 is a flow chart that illustrates an example method for placing a reference and generating a placement identifier that can be used to generate parentage information, according to an embodiment of the invention. A first instance of a reference to a widget container that contains a first placement identifier is included in a first processor-readable vehicle at 600. The widget container can contain a placement service module that can be used to place a second instance of the reference in a second-processor readable vehicle.

The first instance of the reference to the widget container is accessed from the first processor-readable vehicle at a widget-container processing device 610. The widget-container processing device can be, for example, a personal computer. An instance of the widget container is then sent to and executed at the widget-container processing device in response to the first instance of the reference being accessed at 620. The widget container is executed such that the placement service module can be used to place a second instance of the reference in a second processor-readable vehicle. For example, the widget container can be sent to and executed on a personal computer from a database controlled by a widget container host.

After the widget container has been executed at the widget-container processing device at 620, a request can be sent to a widget-container host to place a second instance of the reference to the widget container in a second processor-readable vehicle using the placement service module at 630. For example, a user can use the placement service module to request that the second instance of the reference be placed in the second processor-readable vehicle. The widget-container host can then generate and associate a second placement identifier with the second instance of the reference at 640. The first placement identifier and the second placement identifier can both be, for example, GUID's.

In some embodiments, a service module (e.g., service placement module) within the widget container can be used to generate the second placement identifier and associate the second placement identifier with the second instance of the reference. In some embodiments, a separate host can be triggered, for example, by the widget-container host and/or a placement service module to generate the second placement identifier and associate the second placement identifier with the second instance of the reference.

The second instance of the reference (with the second placement identifier) can then be placed in the second-processor readable vehicle at 650. In some embodiments, the widget container host negotiates with a host server (e.g., using a series of scripted hypertext transfer protocol (HTTP) requests) of the second-processor readable vehicle to place the second instance of the reference (with the second placement identifier) in the second-processor readable vehicle. If the second-processor readable vehicle requires authentication before the second instance of the reference can be placed, the information necessary for authentication (e.g., username, password, etc.) can be securely collected via the placement service module and transmitted to the widget-container host.

The first placement identifier and the second placement identifier can be associated as parentage information at 660. The first placement identifier and the second placement identifier can be associated at the widget-container host. For example, the placement service module can be configured to send the first placement identifier (and associated first processor-readable vehicle information) to the widget-container host so that when the widget-container host generates the second placement identifier and places the second instance of the reference in the second processor-readable vehicle the first placement identifier and the second placement identifier can be associated. The first placement identifier can be identified as a parent identifier and the second placement identifier can be identified as a child identifier. Likewise, the first instance of the reference can be identified as a parent reference and the second instance of the reference can be identified as a child reference. This parentage information can be stored in the widget-container host where the parentage information can be used.

In some embodiments, the placement service module can be used to place an instance of a reference from a first processor-readable vehicle that is used on a first platform (e.g., personal computer platform) in a second processor-readable vehicle that is used on a second and different platform (e.g., mobile phone platform).

Figure 7:
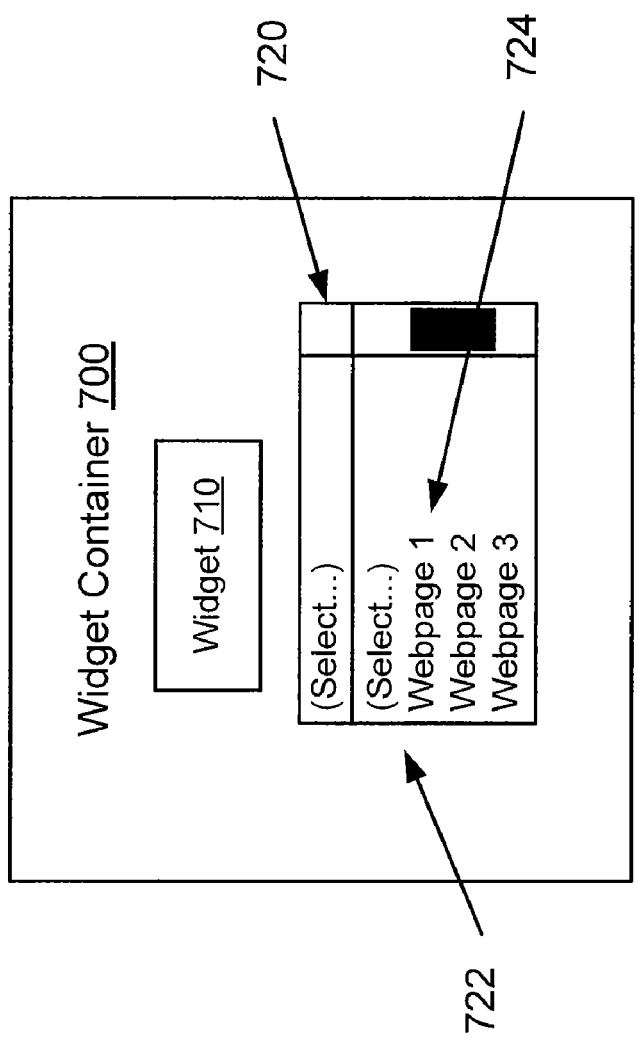
FIG. 7 is a schematic diagram of a widget container that contains a widget and a placement service module, according to an embodiment of the invention.

FIG. 7 is a schematic diagram of a widget container 700 that contains a widget 710 and a placement service module 720, according to an embodiment of the invention. The placement service module 720 has a dropdown menu 722 that can be used to place an instance of a reference to the widget container in one of several webpages 724.

In some embodiments of the invention, metadata parameter values are stored and associated with widget containers, components of widget containers, and other information associated with widget containers (e.g., sessions established during the transmission of widget containers). FIG. 8 is an example metadata database 800 that illustrates some of the metadata parameters and values that can be generated for and associated with widget containers 820, according to an embodiment of the invention. Specifically, this metadata database 800 includes metadata associated with widget containers A and B.

The placement ID column 830 includes the placement ID's of instances of references to the widget containers A and B placed in processor-readable vehicles indicated in the processor-readable vehicle column 840. For example, a reference to widget container A has been placed in processor-readable vehicles URL1 and URL2 as indicated in the processor-readable vehicle column 840. Each of these placements has been assigned a unique placement ID as indicated by the placement ID's P1 and P2 included in the placement ID column 830. This metadata database 800 shows that only one placement ID 830 is associated with a single placement in a processor-readable vehicle 840. Multiple identifiers (not shown), however, can be used to identify a single processor-readable vehicle from column 840 (e.g., multiple variations of a single webpage address that point to a single webpage). The identifiers for a processor-readable vehicle can be referred to as vehicle identifiers. Thus, a placement ID 830 can be associated with multiple vehicle identifiers for a single processor-readable vehicle from column 840.

In some embodiments, the placement ID's 830 (e.g., P2) and vehicle identifiers for the processor-readable vehicles 840 (e.g., URL2) can be combined to create unique identifiers for the placement ID and processor-readable vehicle combinations. These unique identifier that are combinations of the placement ID's 830 and the processor-readable vehicles 840 can be used as pointers to the widget containers 820, for example, when included in a reference (e.g., embed tag) of a processor-readable vehicle 840. These unique combined identifiers can be encrypted and/or encoded using an algorithm and un-encrypted and/or decoded using the algorithm (or a different algorithm) when used by, for example, a widget container host.

Also this exemplary embodiment shows that URL2 includes two different widget containers A and B. Each of the widget containers A and B are associated with unique placement ID's P2 and P3, respectively. Unique metadata (e.g., viewer preferences) can be associated with each of these placements (i.e., instances).

The session ID column 850 indicates the unique session ID's of sessions that have been established and used for sending, for example, widget container A to the processor-readable vehicle URL1 associated with placement ID P1. The metadata database 800 shows that an instance of widget container A has been sent using a session with session ID 1 in response to the reference associated with placement ID P1 being accessed from processor-readable vehicle URL1.

The widget column 860 includes data that indicates the widgets 860 that have been contained in the widget containers 820. In this embodiment, only a single widget 860 is contained in each of the widget containers 820. In some embodiments, the widget containers 820 can include more than one widget 820. For example, the widget container A can include two widgets, for example, for a specific placement ID 830.

The service module column 870 includes data that indicates the service modules that are contained in the widget containers 820 for each of the placement ID's 830. For example, the metadata database 800 shows that widget container A for placement ID P1 contains service module J while the widget container B contains service modules J and L for placement ID P2 during both session ID's 2 and 3.

A tracking parameter column 880 includes tracking parameter values that can be associated with any of the metadata in the metadata database 800 (e.g., placement ID 830 data, processor-readable vehicle 840 data, session ID 850 data, widget 860 data, and/or service module 870 data, etc.). A value of the tracking parameter 880 can be collected and/or generated using, for example, a module, such as a tracking kernel/module, integrated into the procedural software framework of the widget container. A value of the tracking parameter 880 can indicate, for example, the number of times that a particular user has interacted with (e.g., moused over, clicked on) widget container B during a particular session ID 850.

A widget-container attribute column 890 includes widget-container attribute metadata can be associated with, for example, the widget containers 820. In some embodiments, the widget-container attribute data can be associated with a particular placement ID 830. The widget-container attribute metadata can be associated with, for example, the size of a widget 860 when displayed, widget container behavior (animation action). The widget-container attribute 890 metadata can be passed to the core of the widget container when the widget container is served. The widget-container attribute 890 metadata which can define the widget container can be used to generate a widget container when served.

The metadata shown in FIG. 8 is an example of the types of metadata that can be stored in a metadata database 800. A metadata database 800 can be configured to include a variety of metadata that can be associated with widget containers 820 and/or widget container related information (e.g., sessions, placement ID's). For example, a database such as metadata database 800 can be modified to include parentage information that shows whether an instance of the reference associated with placement ID P2 is derived from an instance of the reference associated with placement ID P1. In some embodiments, author information (e.g., actual name and/or username, profile) of an entity that created a particular widget container 820 can also be collected and stored in metadata database 800. In some embodiments, author information can be collected specifically for the placement ID's 830. Placer information (e.g., profile) of an entity that placed a reference to, for example, widget container A in processor-readable vehicle URL2 can also be stored. In some embodiments, login information can be stored for each session ID 850.

Metadata stored within the metadata database 800 can be collected and/or generated using, for example, one or more service modules 870 contained in any of the widget containers 820. For example, a preference, which can be stored as metadata, for a particular configuration of widget container A (e.g., theme or style) can be collected from a user via a service module J that includes a feature that allows a user to select a theme. As another example, a weather related service module can collect a zip code so that weather related to an area relevant to the user can be displayed in, for example, widget container B. The sip code can be stored as a metadata parameter value.

In some embodiments, comments made by a user using a service module can be collected and associated with a widget container 820, placement ID 830, processor-readable vehicle 840, etc. The comments made by a user can be stored as metadata parameter value in the metadata database 800. In some embodiments, rating/polling information (e.g., opinion of a widget on a scale of 1 to 10) collected using a service module can be stored as a metadata parameter value in the metadata database 800. In some embodiments, tagging and/or categorization data (e.g., user-defined tagging/categorization of widgets) collected using a service module can also be stored as metadata in the metadata database 800.

Metadata within a metadata database 800 can be further included in at least one of three categories: widget-container originator ("originator") metadata, widget-container placer ("placer") metadata, and/or widget-container viewer ("viewer") metadata. An originator is an entity (e.g., user) that triggers the generation of a widget container and/or owns (e.g., retains administrative read, write, and execute rights over the widget container) the widget container. A widget-container placer is an entity that can place a widget in a particular processor-readable vehicle. Often a widget-container placer can have control (e.g., owner) of the processor-readable vehicle where a reference to the widget container is placed. A viewer is an entity (e.g., computer or user) that views and/or interacts with a widget container via a processor-readable vehicle (e.g., one that is owned by the widget-container placer).

For example, an identifier (e.g., username, placer identifier) of a widget-container placer can be associated with a placement ID 830. An identifier (e.g., username, viewer identifier) of a viewer can be associated with a particular tracking parameter 880 and/or a session ID 850. In some embodiments, the session can be triggered by a particular widget-container viewer. In many embodiments, an identifier (e.g., username, originator identifier) associated with an originator can be included in the metadata database 800 as author information.

The rights (e.g., read, write, execute, etc.) associated with a widget-container and/or its components can also be assigned and/or delegated based on, for example, a username. An originator, as an administrative owner of a particular widget container, can delegate rights to widget-container placers and/or widget-container viewers. The rights can include not only interaction rights (e.g., rights to access or execute certain portions of a widget container), but also rights to create certain types of metadata. The rights of the originator can, in some embodiments, be limited by a policy implemented by, for example, a widget-container generation engine. For example, a specific originator may not be granted rights (e.g., not authorized via an authentication process) to containerize a specific type of widget in a widget container.

An originator can containerize, for example, a service module in a widget container that allows a widget-container placer and/or viewer to perform a specific function. For example, an originator can include a placement service module in a widget container that allows a placer to place a widget container while only allowing a viewer rights only to execute and/or view a widget container. As another example, a widget originator can include a service module in a widget container that allows a viewer to modify a theme of the widget container. In some embodiments, a placer can delegate rights to a viewer within the scope of rights delegated from an originator and/or based on rights granted by a widget-container generation engine when a widget container is generated. A person of ordinary skill in the art should appreciate that rights can be assigned in a variety of hierarchies and/or using a variety of methods.

The widget-container originator metadata can be referred to as global metadata because changes made to a widget container by a originator can be propagated to all instances of widget containers when served for viewing within a processor-readable vehicle. For example, a change to a widget container by the widget-container originator to a theme of the widget container can be propagated to all instances of widget containers when executed with a processor-readable vehicle.

The placer metadata can be referred to as local metadata because, for example, preferences of a placer stored as metadata can be associated only with the placement of a reference to the widget-container in a specific processor-readable vehicle. The widget container can be modified according to the preferences of the placer when the widget container is served to the processor-readable vehicle associated with (e.g., owned by) the placer. The placer metadata can, in some embodiments, also be global metadata that can cause changes to all instances of widget containers.

The viewer metadata and metadata parameter values can be quasi-local metadata because, for example, preferences of a viewer stored as metadata can be associated with one or more placements of a reference to the widget-container. The viewer metadata parameter values can be used to configure (or dynamically configure) one or more widget containers. For example, a first viewer metadata parameter value associated with a viewer can be used to configure a first widget container served to a processor-readable vehicle while a second viewer metadata parameter value associated with the same viewer can be used to configure a second widget-container served to the same processor-readable vehicle. In some embodiments, a first viewer metadata parameter value associated with a viewer can be associated with a first placement of a widget and a second viewer metadata parameter value associated with the same viewer can be associated with a second placement of the same widget. The first placement and the second placement can be included in a single processor-readable vehicle.

In some embodiments, a viewer metadata parameter value can be associated with a widget container no matter how many instances of the widget container are served and/or regardless of which processor-readable vehicles the widget container is served to. The viewer metadata can be associated with an instance of the widget container based on the credentials (e.g., viewer identifier, username/password) of the viewer. The credentials can be collected when the widget container is requested from, for example, a processor-readable vehicle. The credentials of the viewer can then be used to find viewer metadata that can later be used to dynamically modify the widget container when the widget container is served. In some embodiments, viewer metadata can be configured as local or global metadata.

Figure 9:
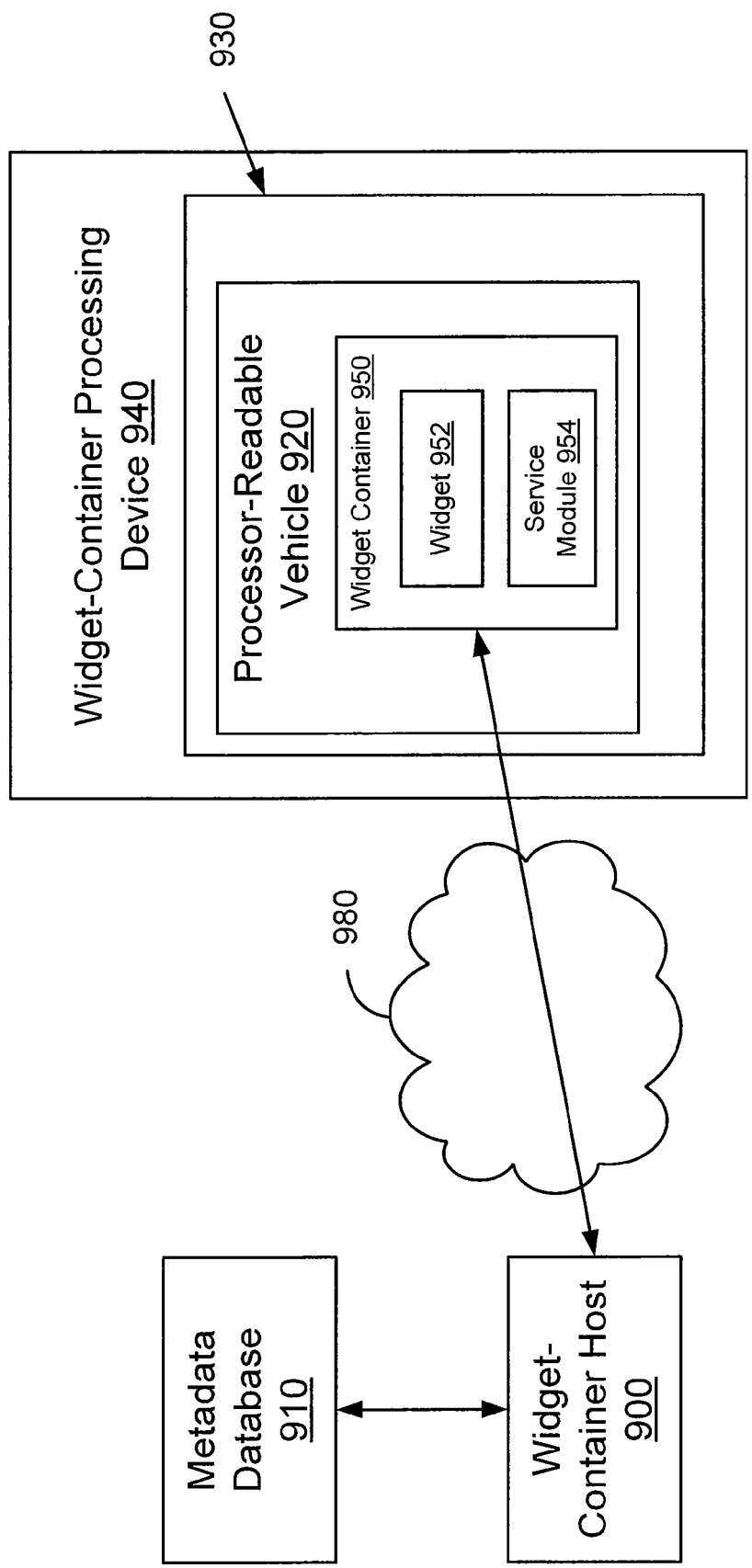
FIG. 9 is a schematic diagram illustrating a widget-container host accessing metadata parameter values from a metadata database, according to an embodiment of the invention.

The metadata parameter values stored in the metadata database 800 can be retrieved and used by, for example, a widget-container host when serving a widget container in response to a request for the widget container from a widget-container processing device. FIG. 9 is a schematic diagram illustrating a widget-container host 900 accessing metadata from a metadata database 910, according to an embodiment of the invention. The widget-container host 900 can be configured to retrieve and/or write metadata to the metadata database 910 at various times.

For example, the widget-container host 900 can be configured to store metadata when the widget container 950 is first generated and store metadata when the widget container 950 is executed and/or accessed. In some embodiments, the widget-container host 900 can receive a metadata parameter value via a service module 954 of the widget container 950 and the widget-container host 900 can store the metadata parameter value in the metadata database 910. In some embodiments, the widget-container host 900 can receive a metadata parameter value such as a tracking parameter value in response to a user-triggered interaction with the widget container 950 and can store the tracking parameter value in the metadata database 910. In some embodiments, tracking parameter values are not sent from the widget container until the widget container 950 is closed (e.g., no longer being executed).

In some embodiments, the widget-container host 900 can be configured to retrieve information to dynamically modify a widget container when serving the widget container 950 and/or after the widget container 950 has been served. For example, a preference stored as a metadata parameter value in the metadata database can be retrieved and used to configured the widget container 950 before a widget container 950 is sent over a network 980 for execution within a framework of a processor-readable vehicle 920 in response to a reference to the widget container 950 being accessed from the processor-readable vehicle 920. The preference can be stored as a local metadata parameter value, global metadata parameter value, an originator metadata parameter value, placer metadata parameter value, and/or viewer metadata parameter value.

For example, the preference can be a local metadata preference (e.g., style, location) associated with an instance of a reference associated with the processor-readable vehicle 920 or a preference associated with a separate instance of the reference in a different processor-readable vehicle (not shown). The preference can be retrieved, for example, after receiving a request for the widget container 950 and used by the widget-container host 900 to modify the widget container 950 just before an instance of the widget container 950 is served to the container processing device 940.

In some embodiments, the metadata database 910 is a single database or set of databases included in the widget-container host 900. The metadata database 910 can also be accessed by the widget-container host 900 via a network such as network 980.

In some embodiments, the widget container 950 can include a core framework that has at least some portions that are defined by metadata parameter values stored in the metadata database 910 (or received in a request for the widget container 950). For example, the size/color/theme of the widget container 950, the widget 952 and/or service module 954 contained in the widget container 950, etc. can be defined using metadata parameter values stored in the metadata 910. The metadata parameter values that are used to define the widget container 950 can be retrieved just before an instance of the widget container 950 is served to the widget-container processing device 940 (e.g., for execution within the framework of the processor-readable vehicle 920). The widget container 950 can be generated (or regenerated) based on the defined metadata parameter values.

Figure 10:
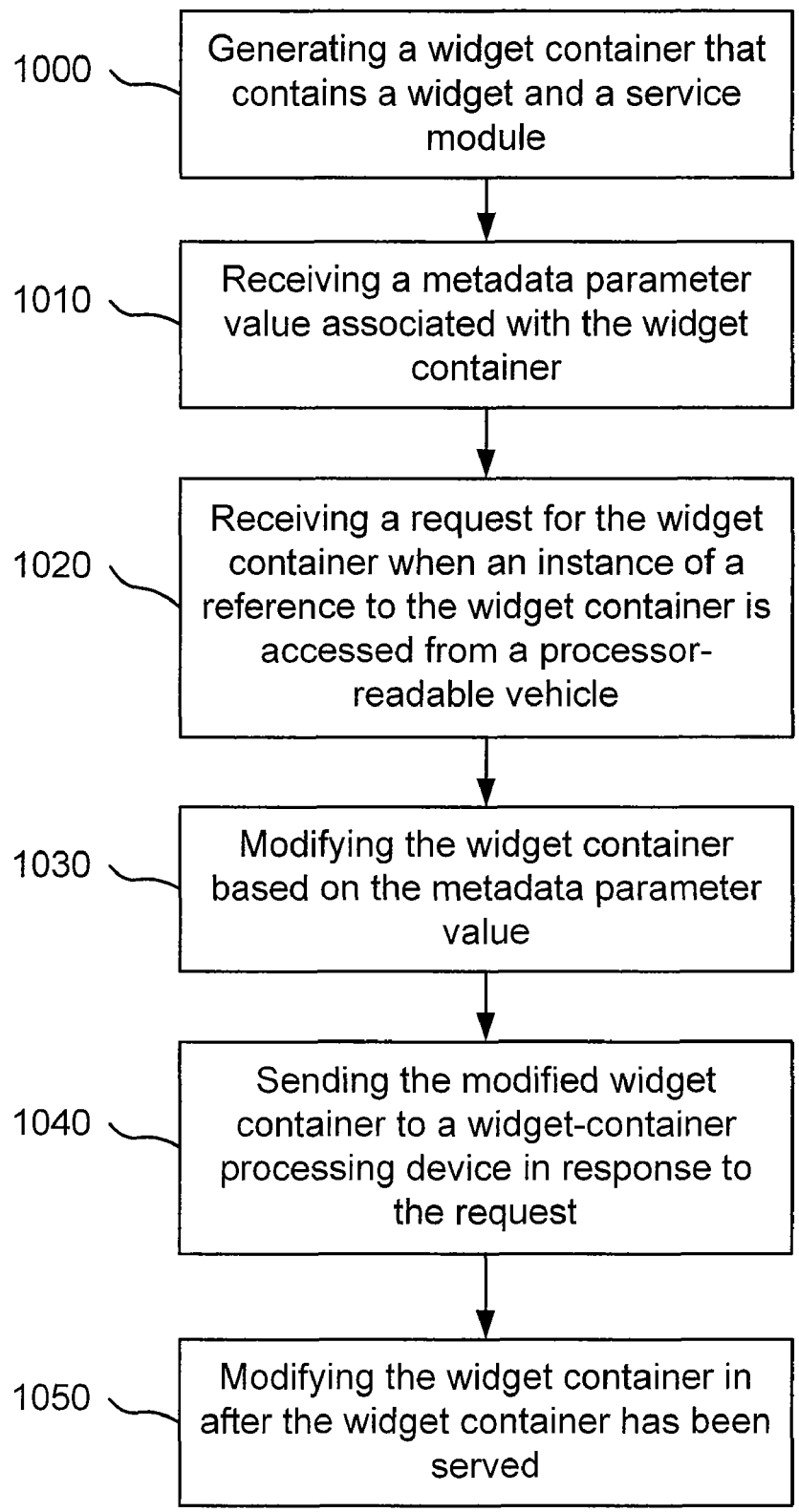
FIG. 10 is a flow chart that illustrates a method for dynamically modifying a widget container, according to an embodiment of the invention.

FIG. 10 is a flow chart that illustrates a method for dynamically modifying a widget container, according to an embodiment of the invention. The flow chart shows that a widget container that contains a widget and a service module is generated at 1000. A metadata parameter value associated with the widget container is received at 1010. The metadata parameter value can be a local metadata parameter value and/or global metadata parameter value associated with, for example, an originator, placer, and/or viewer.

A request for the widget container is received when an instance of a reference to the widget container is accessed from a processor-readable vehicle at 1020. The widget container is modified based on the metadata parameter value at 1030. The widget container can be modified at, for example, a widget-container host according to a metadata parameter value accessed from a metadata database. The metadata parameter value can also be a metadata parameter value included in the request for the widget container.

After the widget container has been modified at 1030, the modified widget container is sent to the widget-container processing device in response to the request at 1040. Although the flow chart shows that the metadata parameter value is received at 1010 before a request for the widget container is received at 1020, the metadata parameter value can be received at any time before the widget container is modified. Also, the modifying of the widget container includes defining the widget container according to the metadata parameter values.

The widget container can also be modified after the widget container has been served at 1050 to the widget-container processing device. For example, a viewer, originator (e.g., creator/owner), and/or placer of the widget container can modify and/or define a parameter, for example, that can be used to modify the widget container. In some embodiments, the parameter can be modified and/or defined at the widget-container processing device using, for example, a service module included in the widget container (i.e., user-triggered interaction). In some embodiments, the parameter can be sent to a widget container host that defines an instruction that can then be sent to the widget-container processing device so that the widget-container processing device can modify the widget container according to the instruction.

In some embodiments of the invention, metadata parameter values can be used to search for and/or identify a portion of a widget container. For example, a metadata parameter value search can be used to identify a widget, service module, and/or widget container, for example, for execution or display within a processor readable vehicle.

Figure 11:
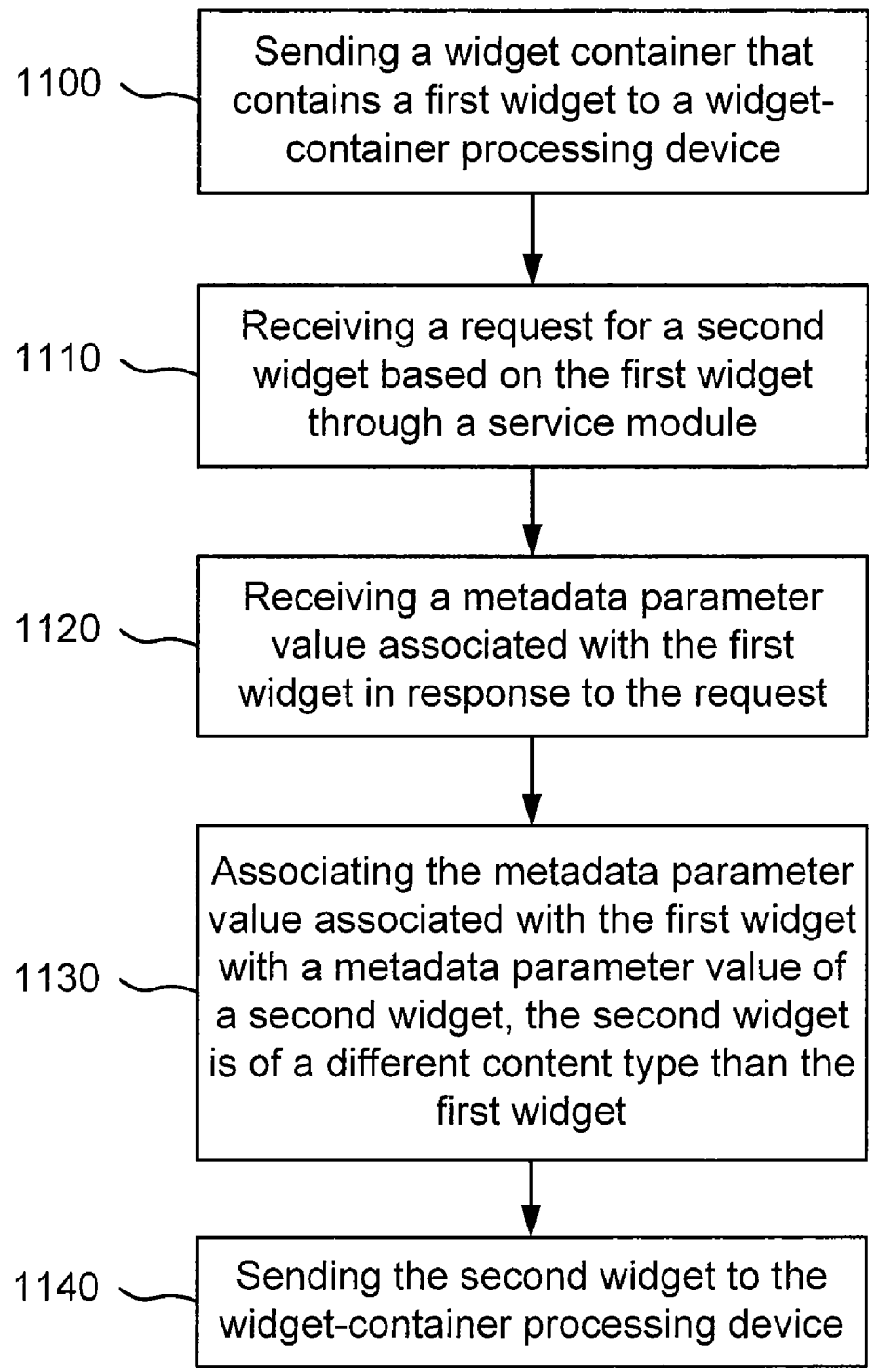
FIG. 11 is a flow chart that illustrates a method for retrieving a widget using metadata parameter values, according to an embodiment of the invention.

FIG. 11 is a flow chart that illustrates a method for retrieving a widget using metadata parameter values, according to an embodiment of the invention. The flow chart shows that a widget container that contains a first widget is sent to a widget-container processing device at 1100. The widget container can be sent to the widget-container processing device from a widget-container host in response to a reference to the widget container being accessed at a processor-readable vehicle.

A request for a second widget based on the first widget is received via a service module at 1110. The request can be received at, for example, a widget-container host from the widget-container processing device. The request can be, for example, a request to retrieve a second widget similar in content to (e.g., like) the first widget.

A metadata parameter value associated with the first widget is received in response to the request at 1120. The parameters of the request, when received at, for example, a widget-container host, can be used to retrieve a metadata parameter value associated with the first widget. The metadata parameter value associated with the first widget can then be used to retrieve a second widget. For example, if the request is for a second widget containing content like the first widget, a metadata parameter value that describes the content of the first widget can be retrieved.

The metadata parameter value associated with the first widget is associated with a metadata parameter value of the second widget at 1130. The metadata parameter value associated with the first widget is used, for example, to search for and retrieve the metadata parameter value of the second widget from a metadata database. The associating of the metadata parameter values can be based on a threshold criteria (e.g., policy) within a search engine. In this embodiment, the second widget is of a different content type than the first widget (e.g., the first widget is a video widget and the second widget is an image widget or software widget). In some embodiments, the second widget is the same content type as the first widget.

Finally, after the second widget is identified using the metadata parameter value from the first widget, the second widget is sent to the widget-container processing device at 1140. The second widget can be, for example, executed and/or displayed within the procedural software framework of the widget container.

In conclusion, the present invention provides an apparatus and methods for containerization of static, media, and/or software objects in a procedural software framework. Those skilled in the art can readily recognize that numerous variations and substitutions may be made in the invention, its use and its configuration to achieve substantially the same results as achieved by the embodiments described herein. Many variations, modifications and alternative constructions fall within the scope and spirit of the disclosed invention as expressed in the claims.

What is claimed is:

1. A method, comprising:
   receiving at a widget-container host at least one of a widget or a reference to the widget, the widget being at least one of a static data object, a media object, or a software object;
   accessing a metadata database entry having at least a portion representing a relationship between a first service module and the widget, the first service module being a pre-defined function configured to provide a service associated with the widget;
   generating, at a first time and at the widget-container host, at least a portion of a widget container based on the entry and in response to receiving a user-initiated request from a webpage having a reference to the widget container, the widget container being a procedural software framework including a reference to the widget and the first service module associated with the widget, the widget container configured to be executed at a widget-container processing device in response to the user-initiated request;
   integrating a tracking kernel into the widget container, the tracking kernel configured to track a user-triggered interaction with at least one of the widget or the widget container; and
   regenerating, at a second time different than the first time, the widget container in response to an instruction such that the widget container includes a second service module configured to provide a different service associated with the widget than the first service module.

2. The method of claim 1, wherein the generating includes generating the widget container when the widget container is served by the widget-container host.

3. The method of claim 1, wherein the widget container is configured to be executed within the webpage at the widget-container processing device.

4. The method of claim 1, further comprising:
   selecting, before the generating, the first service module from a library of service modules based on a policy.

5. The method of claim 1, wherein the widget has a content type, the first service module is selected from a set of service modules, and the set of service modules is defined based on the content type.

6. The method of claim 1, wherein the webpage is a first webpage, the reference to the widget container is a first reference, and the first service module is a placement service module associated with placement of a second reference to the widget container in a second webpage.

7. The method of claim 1, wherein the generating includes compiling the widget container as a discrete portable module.

8. The method of claim 1, wherein the reference to the widget is provided to the widget-container host via a widget-container generation engine, and the first service module is selected via a widget-container generation user-interface associated with the widget-container generation engine.

9. The method of claim 1, wherein the first service module is at least one of a customizable service module and a service module that includes a customizable component integrated into the first service module.

10. The method of claim 1, wherein the first service module and the second service module are each configured to perform at least one of a metadata searching function, a metadata retrieval function, a polling function, a widget container deployment function, a transaction service function, a widget container tracking function, a referral service function, an advertisement service function, and a directory service function.

11. The method of claim 1, further comprising:
    sending an indication of the user-triggered interaction to a tracking server.

12. The method of claim 1, wherein the user-triggered interaction includes at least one of mouse movements associated with the widget container, a number of impressions for the widget container, widget container visitor profiles, information associated with the widget-container processing device, and information associated with the webpage.

13. The method of claim 1, wherein the reference to the widget container is one of an embed tag and an object tag on the webpage that serves as a link to the widget container.

14. The method of claim 1, wherein the widget container includes a series of instructions configured to be executed by the widget-container processing device to provide an executable environment for the widget.

15. A method, comprising:
    receiving at a widget-container host a request for a widget container from a widget-container processing device, the request being defined in response to a first reference to the widget container being accessed at a webpage;
    accessing, in response to the request, a plurality of metadata parameter values from a metadata database;
    defining the widget container based on the plurality of metadata parameter values, the widget container being a procedural software framework including a reference to a widget, the widget being at least one of a static data object, a media object and a software object, the reference to the widget being configured such that the widget is served into the widget container from a widget server independent from the widget-container host in response to the reference to the widget being accessed at the widget-container processing device,
    the widget container including a service module configured to provide a service associated with the widget and including an identifier that indicates that the first reference to the widget container was derived from a second reference to the widget container, the service module being selected from a library of service modules based on a metadata value from the plurality of metadata parameter values; and
    sending from the widget-container host the widget container to the widget-container processing device after the defining is performed.

16. The method of claim 15,
wherein the receiving includes receiving at a first time, the sending includes sending at a second time, and the second time is after the first time,
the method further comprising:
modifying at an intermediate time at least one of the widget container, the reference to the widget, or the service module based a segment of data injected into a specified location of the widget container, the intermediate time being before the second time and after the first time.

17. The method of claim 15,
wherein the receiving includes receiving at a first time, the sending includes sending at a second time, and the second time is after the first time,
the method further comprising:
modifying at an intermediate time at least one of the widget container, the reference to the widget, and the service module based on at least one of a global metadata parameter value and a local metadata parameter value associated with the first reference to the widget container, the intermediate time being before the second time and after the first time.

18. The method of claim 15, wherein the sending includes sending from the widget-container host based on a unique widget container identifier included in the request.

19. The method of claim 15, wherein the widget container is executed when received at the widget-container processing device.

20. The method of claim 15,
wherein the sending includes sending from the widget-container host, and the sending includes establishing a session between the widget-container processing device and the widget-container host,
the method further comprising:
associating with the session at least one of a global metadata parameter value and a local metadata parameter value received during the session; and
modifying at least one of the widget container, the reference to the widget, and the service module based on at least one of the global metadata parameter value and the local metadata parameter value.

21. The method of claim 20, wherein the at least one of the global metadata parameter value and the local metadata parameter value is produced using the service module.

22. The method of claim 15, wherein the service module is configured to perform a function associated with parentage tracking of at least one of the widget and an instance of the widget container.

23. The method of claim 15, wherein the widget container is a first instance of the widget container, the reference to the widget is a first reference to the widget, a second instance of the widget container includes a second reference to the widget.

24. An apparatus, comprising:
a widget-container host configured to define an instance of a widget container including a reference to a widget and including a placement service module, the widget being at least one of a static data object, a media object, and a software object, the widget-container host configured to select the placement service module from a library of service modules based on a metadata parameter value,
the widget-container host configured to send the instance of the widget container to a widget-container processing device in response to a first reference to the widget container being accessed at a first webpage, the instance of the widget container being a procedural software framework for the widget, the placement service module of the instance of the widget container configured to accept a user-initiated request to place a second reference to the widget container at a second webpage, the placement service module configured to define at least a portion of parentage information associated with a placement of the second reference to the widget container at the second webpage.

25. The apparatus of claim 24, further comprising:
a metadata database configured to store the metadata parameter value, the metadata parameter value is retrieved from the metadata database by the widget-container host in response the first reference to the widget container being accessed.

26. The apparatus of claim 24, wherein the parentage information associated with the placement of the second reference to the widget container at the second webpage indicates that the second reference to the widget container was derived from the first reference to the widget container.

27. The apparatus of claim 24, wherein the first reference to the widget container is one of an embed tag and an object tag on the first webpage that serves as a link to the widget container.

* * * * *

UNITED STATES PATENT AND TRADEMARK OFFICE
CERTIFICATE OF CORRECTION

| | | |
|---|---|---|
| PATENT NO. | : 8,056,092 B2 | Page 1 of 1 |
| APPLICATION NO. | : 11/537362 | |
| DATED | : November 8, 2011 | |
| INVENTOR(S) | : Allen et al. | |

It is certified that error appears in the above-identified patent and that said Letters Patent is hereby corrected as shown below:

Column 23, line 8, after "based" insert --on--.

Signed and Sealed this
Seventeenth Day of January, 2012

David J. Kappos
*Director of the United States Patent and Trademark Office*